US005735639A

United States Patent [19]

Payne et al.

[11] Patent Number: 5,735,639

[45] Date of Patent: Apr. 7, 1998

[54] MODULAR MOBILE SAFETY STRUCTURE FOR CONTAINMENT AND HANDLING OF HAZARDOUS MATERIALS

[75] Inventors: Edward Payne, Fairfax, Va.; Norman Stephen Van Valkenburgh; Gary Lee Van Valkenburgh, both of Newport Beach, Calif.

[73] Assignee: The United States of America as represented by the Secretary of the Navy, Washington, D.C.

[21] Appl. No.: 766,680

[22] Filed: Dec. 13, 1996

[51] Int. Cl.$^6$ .......... B09B 3/00

[52] U.S. Cl. .......... 405/128; 52/90.1; 206/386; 220/1.5; 296/181; 296/187; 405/52; 588/249; 588/259; 588/900

[58] Field of Search .......... 405/52, 53, 54, 405/55, 128, 129; 52/90.1–93.2, 168, 263, 272, 406–410, 612; 196/24.1, 181, 187; 206/286; 280/400; 588/249, 259, 900

[56] References Cited

U.S. PATENT DOCUMENTS

| | | | |
|---|---|---|---|
| 3,336,069 | 8/1967 | Bayer et al. | 296/24.1 |
| 4,100,860 | 7/1978 | Gablin et al. | 588/259 X |
| 4,390,040 | 6/1983 | Beyen | 588/249 X |
| 4,505,126 | 3/1985 | Jones et al. | 296/24.1 X |
| 4,838,178 | 6/1989 | Chriske et al. | 108/55.1 |
| 4,875,595 | 10/1989 | Van Valkenburgh | 220/1.5 |
| 4,973,195 | 11/1990 | Sweeney et al. | 405/52 |
| 5,052,569 | 10/1991 | Cooper | 220/1.5 |
| 5,167,098 | 12/1992 | Blackwelder | 52/91.1 |
| 5,254,798 | 10/1993 | Zoback | 588/249 X |
| 5,300,137 | 4/1994 | Weyland et al. | 405/128 |
| 5,356,206 | 10/1994 | Van Valkenburgh | 312/317.1 |
| 5,365,013 | 11/1994 | Aulson | 588/249 |
| 5,511,908 | 4/1996 | Van Valkenburgh et al. | 405/128 |

*Primary Examiner*—George A. Suchfield
*Attorney, Agent, or Firm*—Melvin J. Sliwka; David S. Kalmbaugh

[57] ABSTRACT

A mobile safety structure for the storing and handling of containers of hazardous materials comprising multiple modular storage units. The modular storage units may be configured in tandem to form one embodiment of the modular mobile safety structure. In this configuration access between the interiors of adjacent modular storage units is provided by a bellows which is connected to and removable from a bellows support frame in a side wall of each modular storage unit. The modular storage units may also be configured in a stacked arrangement to form an alternate embodiment of the modular mobile safety structure. In this configuration access between the interiors of the stacked modular storage units is provided through an opening between units in the stack. A pull down safety ladder affixed to the roof assembly of all units except the top unit in the stack allows the user to gain access to each unit in the stack of modular storage units. Each modular storage unit includes a secondary containment feature in the form of a base assembly having a containment pan. The base assembly also provides a framework for supporting a floor of removable grating which allows access to the containment pan. Each modular storage unit further comprises front, rear and side walls and a roof of very sturdy construction employing interior and outer surface steel panels supported by a generally rectangular shaped tubular steel framework for each wall and the roof of the mobile safety structure.

20 Claims, 19 Drawing Sheets

MODULAR MOBILE SAFETY STRUCTURE FOR CONTAINMENT AND HANDLING OF HAZARDOUS MATERIALS

BACKGROUND OF THE INVENTION

1. Field of the Invention

This invention relates generally to the handling of hazardous wastes and other hazardous materials. More specifically, the present invention is concerned with a new form of modular mobile safety containment unit for handling, distribution, storing and transporting hazardous materials.

2. Description of the Prior Art

The handling, storage and transport of hazardous materials, and particularly hazardous waste has become a problem of major proportions. Increased emphasis is being placed on the importance of assuring that solvents, lubricants, paint related products, and the like are stored with adequate safeguards. Increasingly, it is being recognized that even small spills and relatively minor leakages of the growing number of substances that are being referred to by the term "hazardous material" can detrimentally affect persons, property, plants, animals, ground water and other aspects of ecology and the environment. Moreover, in view of increasing concern about the lasting nature of the adverse effects that can result from spills and unchecked leakage of hazardous materials, the issue of transportation, storage and distribution of hazardous materials is receiving increasing attention by law-makers, by regulatory agencies, and by those who have been elected to govern and to enforce the laws and regulations relating to hazardous materials.

In the past, the standard form of container for the handling, storage and transportation of hazardous materials has been the 55 gallon steel drum. In transportation of hazardous materials using 55 gallon steel drums, the drums are easily ruptured if an accident occurs. A high impact against a gang of the drums in a truck accident, for example, can cause a sort of domino effect wherein sufficient impact is transferred to a great number of the drums to rupture the drums. This is due to the basic cylindrical shape of the drum as well as its relatively thin walled construction.

During transportation and storage of the drums another hazard which may occur when full drums are stacked which they frequently are because their shape clearly lends itself to stacking. In many instances the drums are stacked eight or nine tiers high. These drums often leak, with the leaking chemicals flowing down to mix with other chemicals below. In this situation, even if the individual chemicals are not in themselves particularly hazardous, an unknown and hazardous combination may result.

When using cylindrical drums there is another potential hazard in that the drums are inherently reusable, even if the drums are not intended for this purpose. Unwitting reuse with an incompatible chemical can cause an explosion or the creation of a dangerous, explosive, poisonous or otherwise hazardous combination. The inherent re-usability of cylindrical drums is a significant disadvantage. Cylindrical drums with explosive materials have been known to ignite and shoot through a building roof in the manner of a rocket. Explosive material can dry and harden from the outside in toward the center of the drum, leaving a hollow core which can act as a rocket nozzle. This is another inherent disadvantage in use cylindrical drums for the storage of explosive hazardous materials.

For these and other reasons, there remains a very genuine and real need for a well designed, heavy duty containment facility that appropriately will address today's increasing concern for the way in which hazardous materials are handled, transported and stored.

There is also a need for a hazardous material containment structure which allows the user to maintain an inventory of the hazardous materials being stored and maintained within the structure.

The above and other needs for a hazardous material containment structure were partially met by U.S. Pat. No. 5,511,908 which issued Apr. 30, 1996 to Norman S. Van Valkenburgh, Gary L. Van Valkenburgh and Edward Payne, co-inventors of the present invention. U.S. Pat. No. 5,511,908 discloses a single self contained storage unit for the storing and handling of containers of hazardous materials which includes a secondary containment feature in the form of a base assembly having a containment pan. The base assembly of the storage unit also provides a framework for supporting a floor of removable grating which allows access to the containment pan. The storage unit further comprises front, rear and side walls and a roof of very sturdy construction employing interior and outer surface steel panels supported by a generally rectangular shaped tubular steel framework for each wall and the roof of the mobile safety structure. There is sandwiched between the interior and outer surface steel panels of each wall a pair of gypsum boards and R-19 fiberglass insulation. The fiberglass installation allows the user of the storage unit of U.S. Pat. No. 5,511,908 to adapt the structure for use under varying climatic conditions, while the gypsum board provides the structure with at least a four hour fire rating. The framework of the storage unit has corner fittings to receive dual wheel casters and a tow bar which in combination allow a tow truck to move the safety structure from a first location to a second location. However, under certain conditions, such as the cleanup of a military installation having significant amounts of jet engine fuel, paints, corrosives and other toxic materials, there is requirement for a containment facility large enough to handle and safely store these hazardous materials. In addition, since these facilities often cover several hundred square miles there is a need for a containment facility to be mobile allowing for its movement from one location to another location on the facility as conditions dictate.

Further, there is a need to provide for a relatively inexpensive and safe mobile hazardous material containment facility to keep cleanup cost under control while maintaining the safety and health of the personnel using the facility.

SUMMARY OF THE INVENTION

The structure of the present invention addresses the foregoing and other needs of hazardous material storage, handling and transportation by providing a environmentally safe modular storage facility comprising multiple modular storage units which will provide a good service life and under circumstances of reasonable use, can be moved from site to site over the years as may be appropriate to address a series of different servicing needs.

The modular storage units may be configured in tandem to form one embodiment of the modular mobile safety structure. In this configuration access between the interiors of adjacent modular storage units is provided by a bellows which is connected to and removable from a bellows support frame in a side wall of each unit.

The modular storage units may also be configured in a stacked arrangement to form an alternate embodiment of the modular mobile safety structure. In this configuration access between the interiors of the stacked modular storage units is provided through an opening between units in the stack. A pull down safety ladder affixed to the roof assembly of all units except the top unit in the stack allows the user to gain access to each unit in the stack of modular storage units.

In a third embodiment the modular storage units may be stacked as well as placed in tandem to form the modular mobile safety structure.

Each modular storage unit of the modular mobile safety structure of the present invention includes a base assembly having a containment pan, right side and left side walls, front and rear walls and a roof assembly. The front wall of the bottom units in a stack each have a door allowing for access to the interior of the structure by its user. The right side wall or the left side of each unit within the modular mobile safety structure may have a bellows support frame which is positioned near the front end of each wall to support the bellows joining adjacent units of the structure.

The base assembly of each modular storage unit has at each corner thereof a corner fitting which is adapted to receive dual wheel casters. The corner fittings at each end of the modular storage unit are also adapted to receive a tow bar which in combination with the dual wheel casters allows a tow truck to move the mobile safety structure from a first location to a second location.

The roof assembly of each modular storage unit also has at each corner thereof a corner fitting. The corner fittings at each corner of the base and roof assembly of modular storage unit are adapted to receive container conlinks which are used to connect adjacent modular storage units when the units are configured in tandem.

When the modular storage units are stacked the corner fittings are adapted to receive twistlock stackers which are used to connect adjacent modular storage units of the stack.

A removable fiberglass or the like grating is also included in the modular storage unit which rest atop the base assembly. The removable grating allows the user of the structure to remove hazardous materials from the containment pan by use of, for example, a pump. The removable grating also allows the user of the modular storage unit to visually inspect the interior of the containment pan for hazardous materials which may be contained therein.

The walls, and roof of each modular storage unit of the mobile safety structure provide for a strong structural enclosure by using interior and outer surface steel panels supported by a generally rectangular shaped tubular steel framework for each wall and the roof of the modular storage unit. There is sandwiched between the interior and outer surface steel panels of each wall a pair of gypsum boards and R-19 fiberglass insulation. The fiberglass insulation allows the user of mobile safety structure to adapt the structure for use under varying climatic conditions, while the gypsum board provides the structure with at least a four hour fire rating.

A better understanding of the modular mobile safety structure comprising the present invention as well as a better recognition of its advantages and novel features will be afforded to those skilled in the art from a consideration of the following detailed description of the a preferred embodiment thereof.

DETAILED DESCRIPTION OF THE PREFERRED EMBODIMENTS

Figure 1:
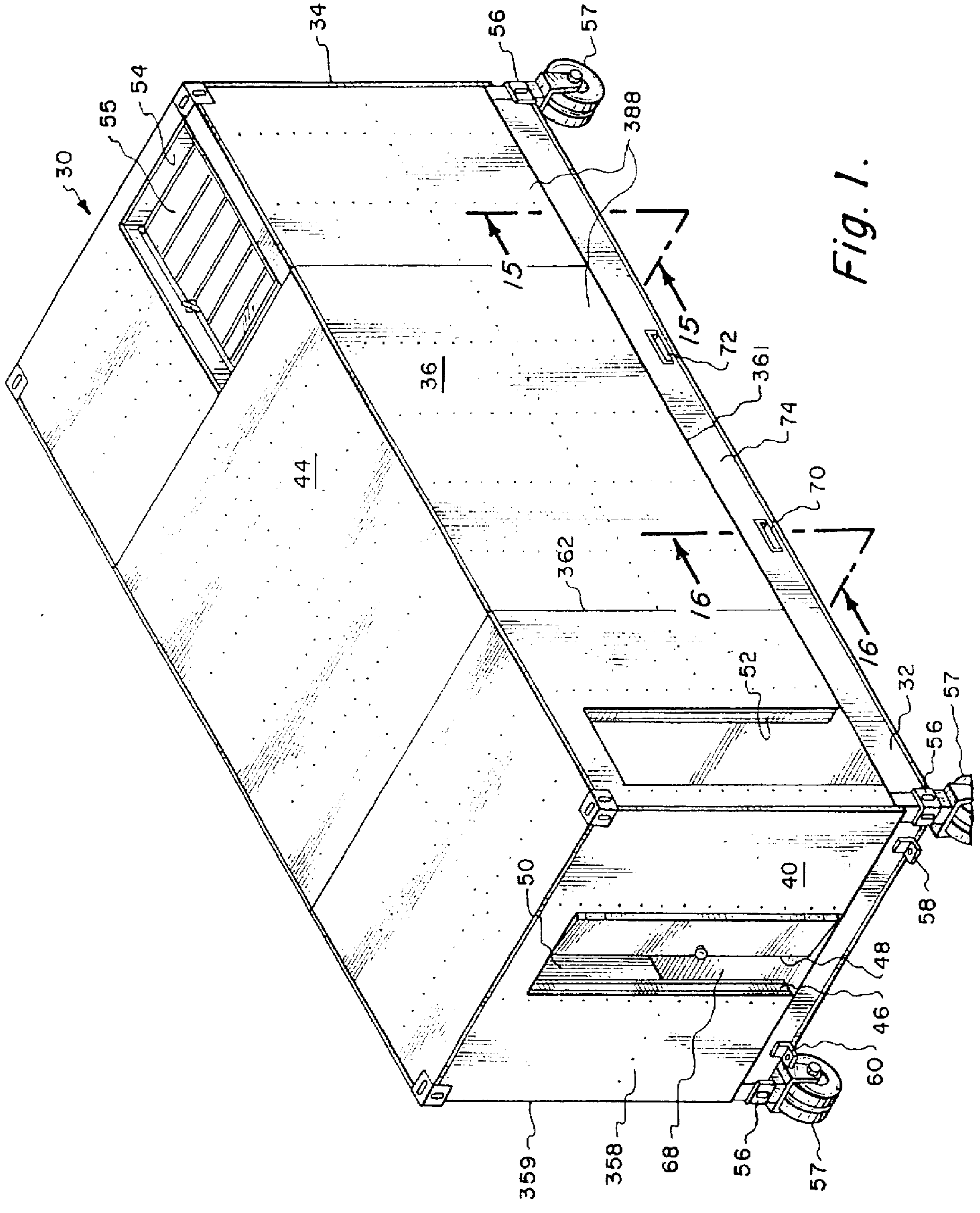
FIG. 1 is a perspective view of a form of one modular storage unit of the modular mobile safety structure that constitutes a preferred embodiment of the present invention.
Figure 2:
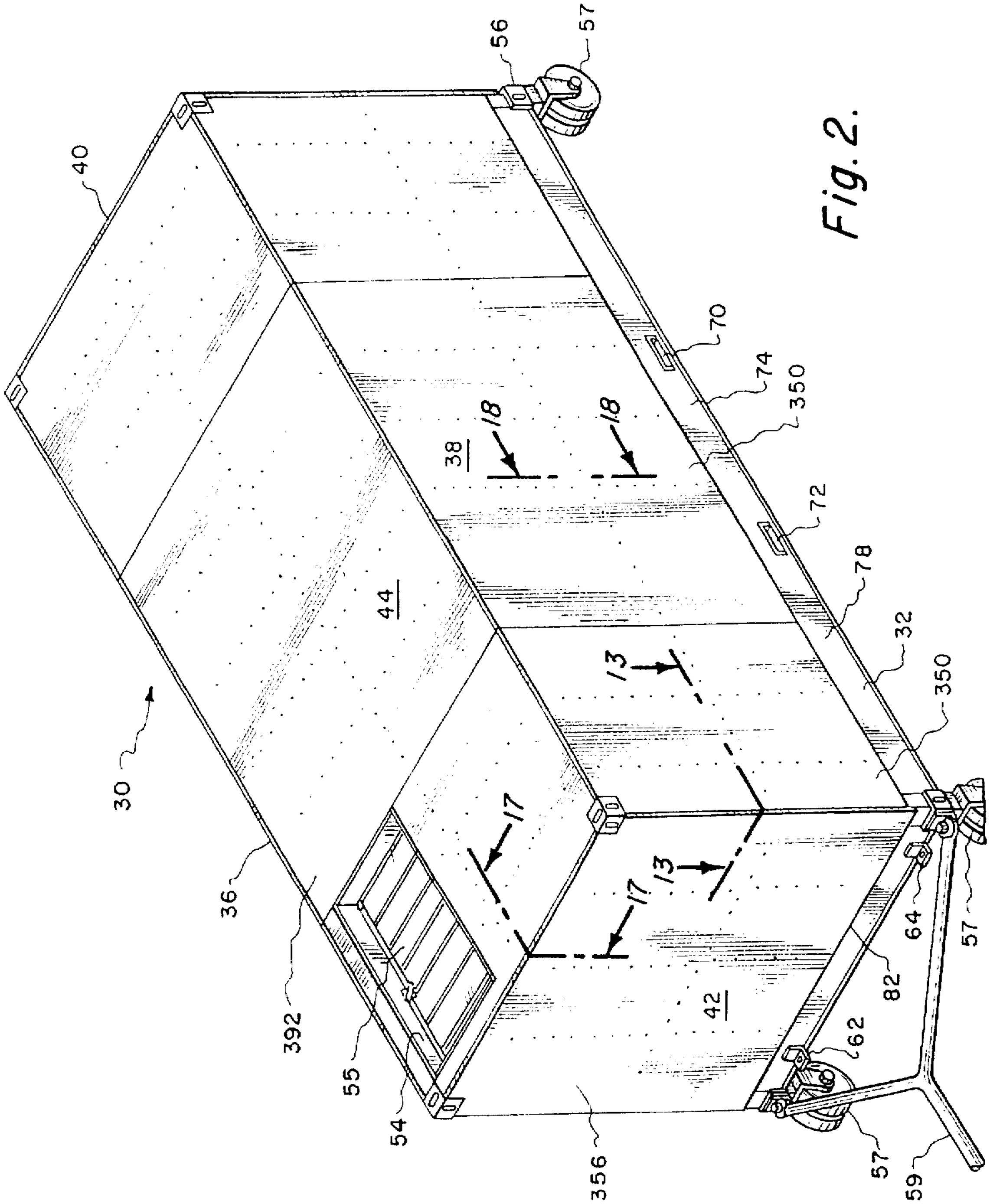
FIG. 2 is an alternate perspective view of the modular storage unit of FIG. 1.

Referring to FIGS. 1 and 2, there is shown a "modular storage unit" or "containment structure" that represents a component or module of the modular mobile safety structure comprising the present invention. The modular storage unit is, in turn, designated generally by the reference numeral 30. Modular storage unit 30 has the general shape of a rectangular box like structure and has overall length, width, height dimensions of approximately 20 feet by 8 feet by 8 feet.

Figure 19:
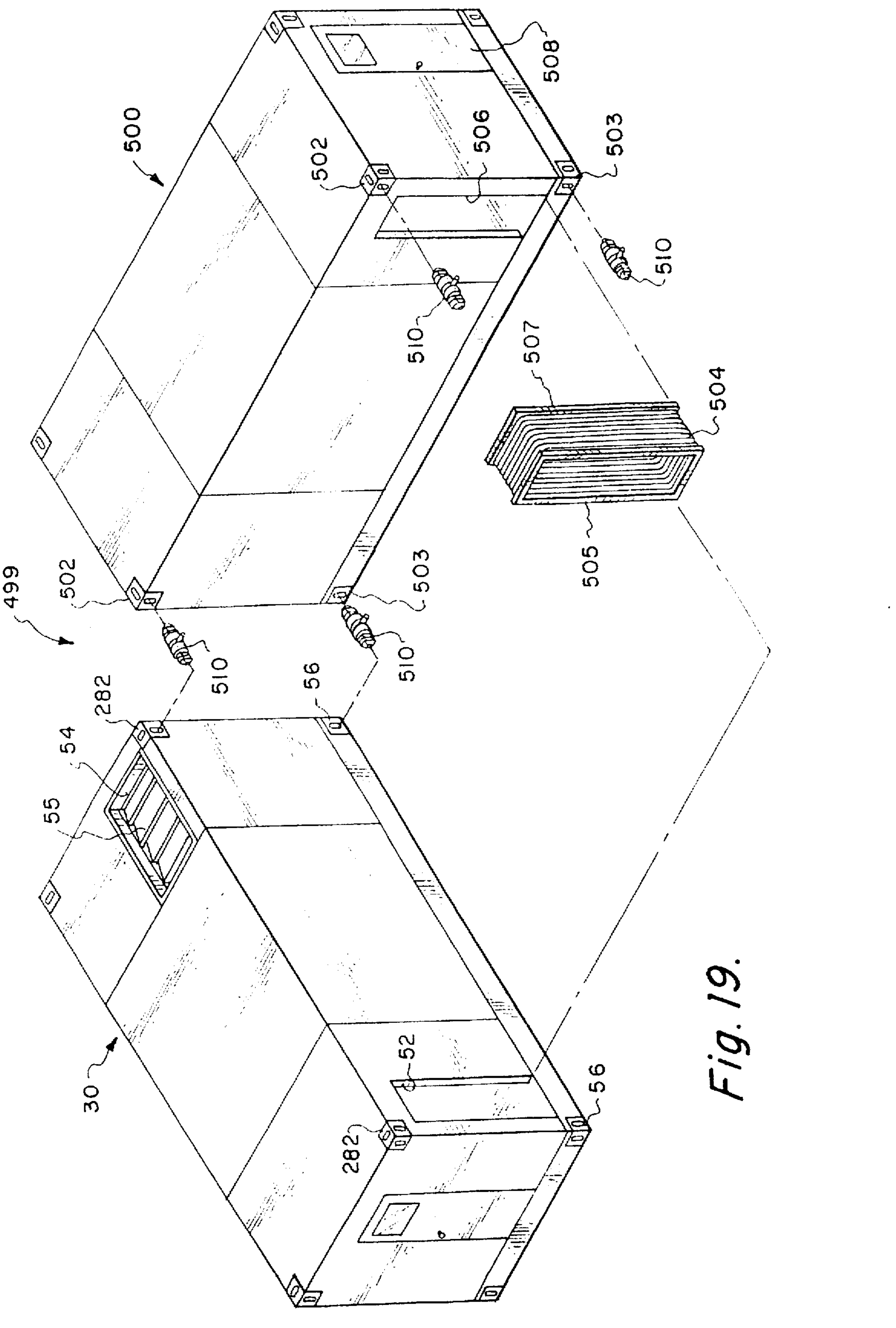
FIG. 19 is an exploded isometric view of an embodiment of the modular mobile safety structure comprising the present invention which includes the modular storage unit of FIG. 1 aligned with and coupled to a second modular storage unit.
Figure 20:
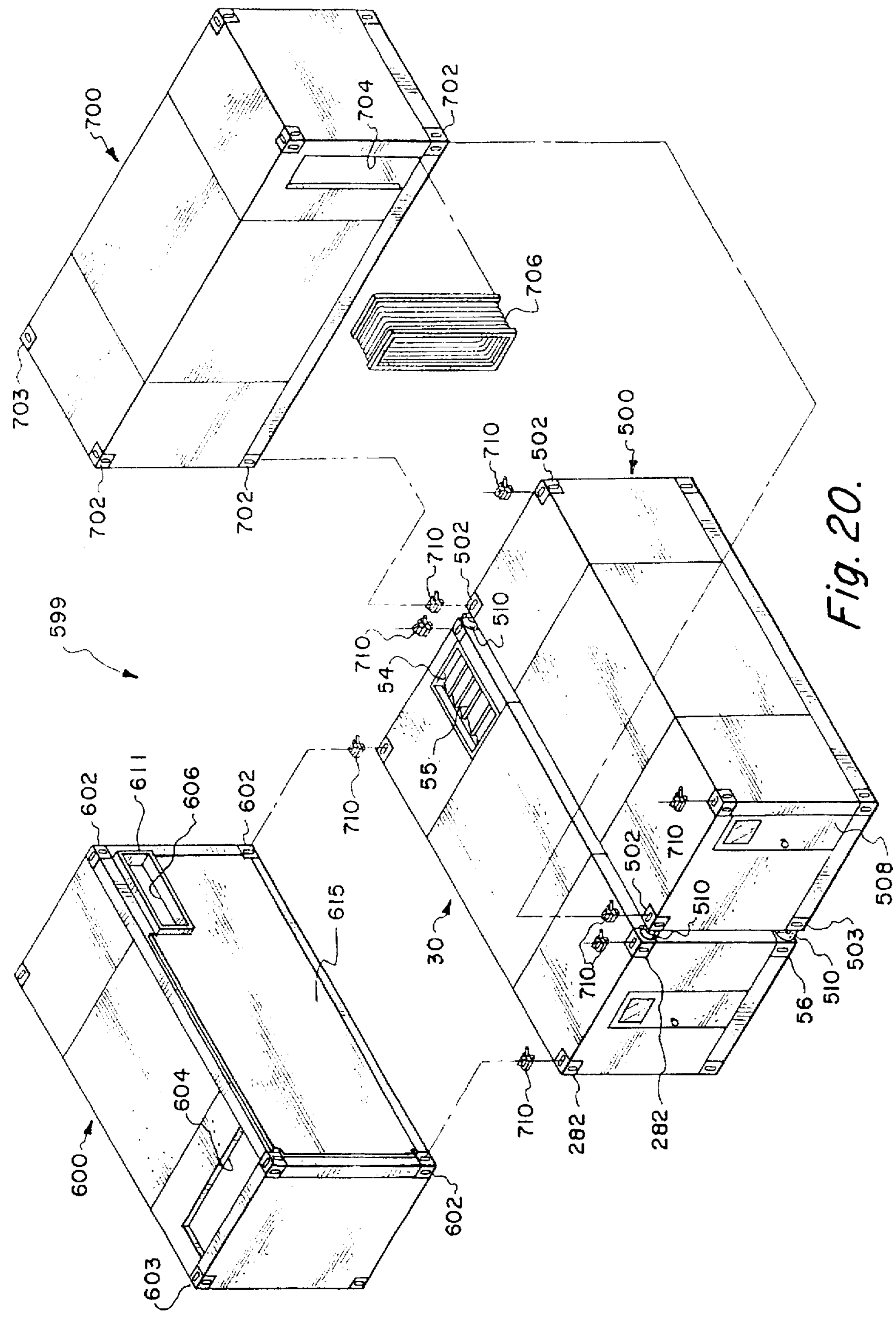
FIG. 20 is an exploded isometric view of an embodiment of the modular mobile safety structure which includes the modular storage units of FIG. 21 and a second pair of adjacent modular storage units stacked on top of the modular storage units of FIG. 21.
Figure 23:
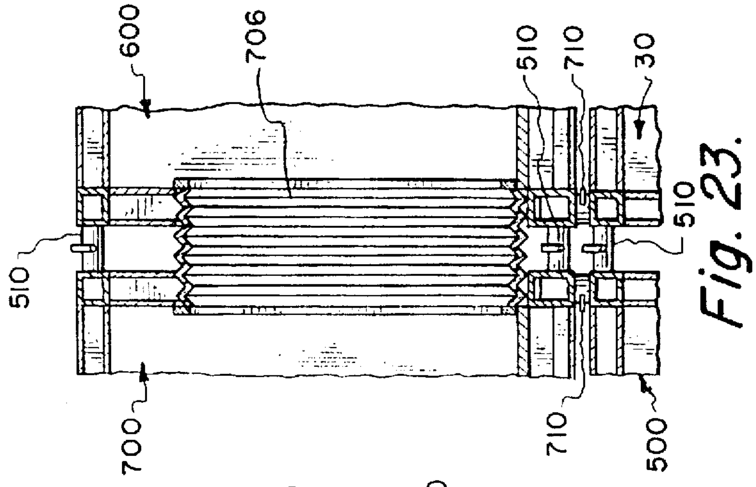
FIG. 23 is a detailed sectional view taken along plane 23—23 of FIG. 22 illustrating a bellows which allows access from one modular storage unit to an adjacent modular storage unit of the modular mobile safety structure of FIG. 22.
Figure 21:
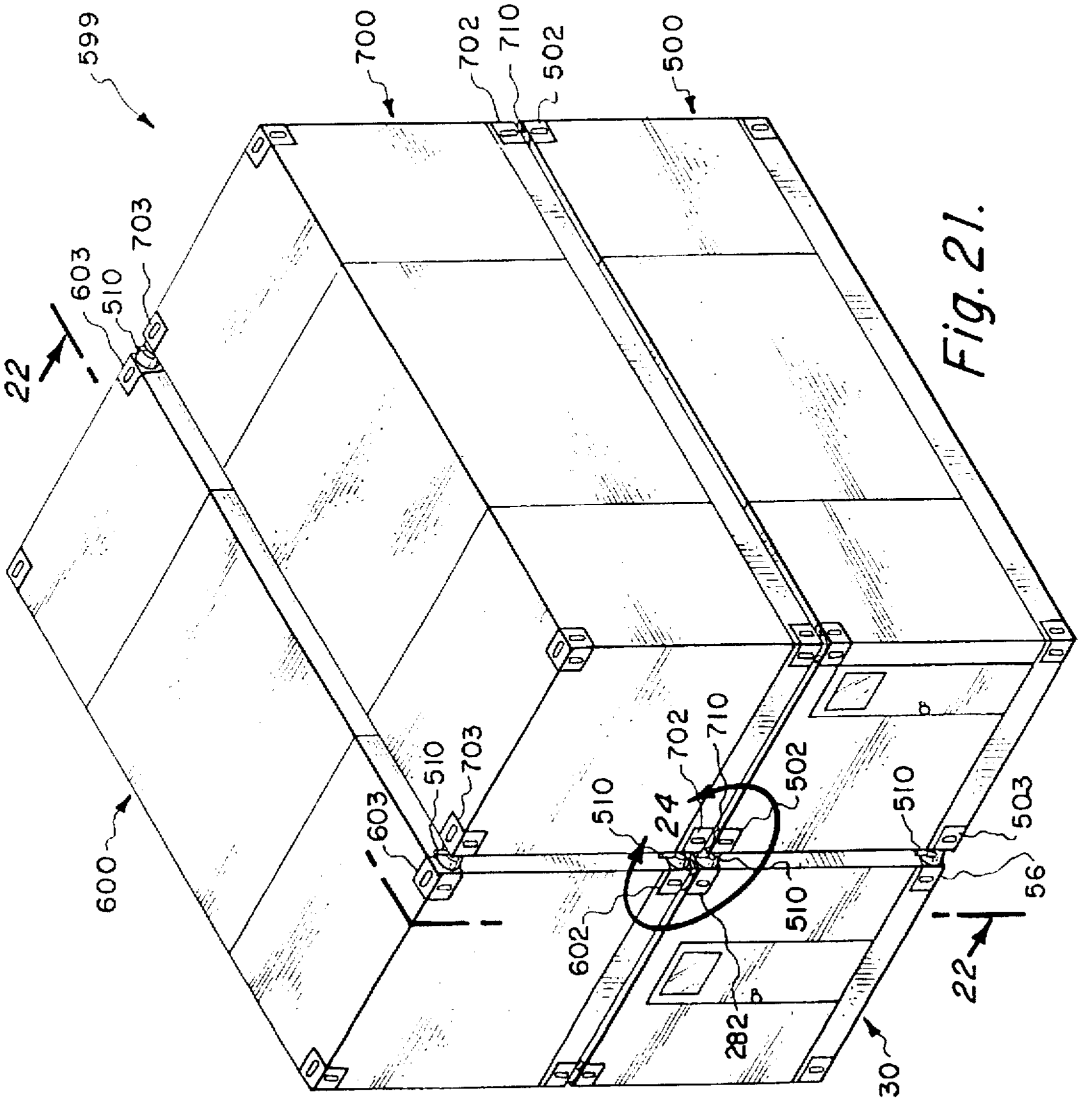
FIG. 21 is an isometric view illustrating the embodiment of the modular mobile safety structure of FIG. 22 fully assembled.

As is best illustrated in FIG. 19, the modular mobile safety structure (designated generally by the reference numeral 499) may include a modular storage unit 30 which is positioned adjacent a second modular storage unit 500 and secured thereto to provide a tandem arrangement of modular storage units 30 and 500 for the treatment and handling of hazardous materials and contaminants. An alternative embodiment of the modular mobile safety structure 599, which is illustrated in FIGS. 20 and 21, includes modular storage units 30 and 500 positioned in tandem and a second pair of tandem modular storage units 600 and 700 stacked on top of units 30 and 500.

Figure 22:
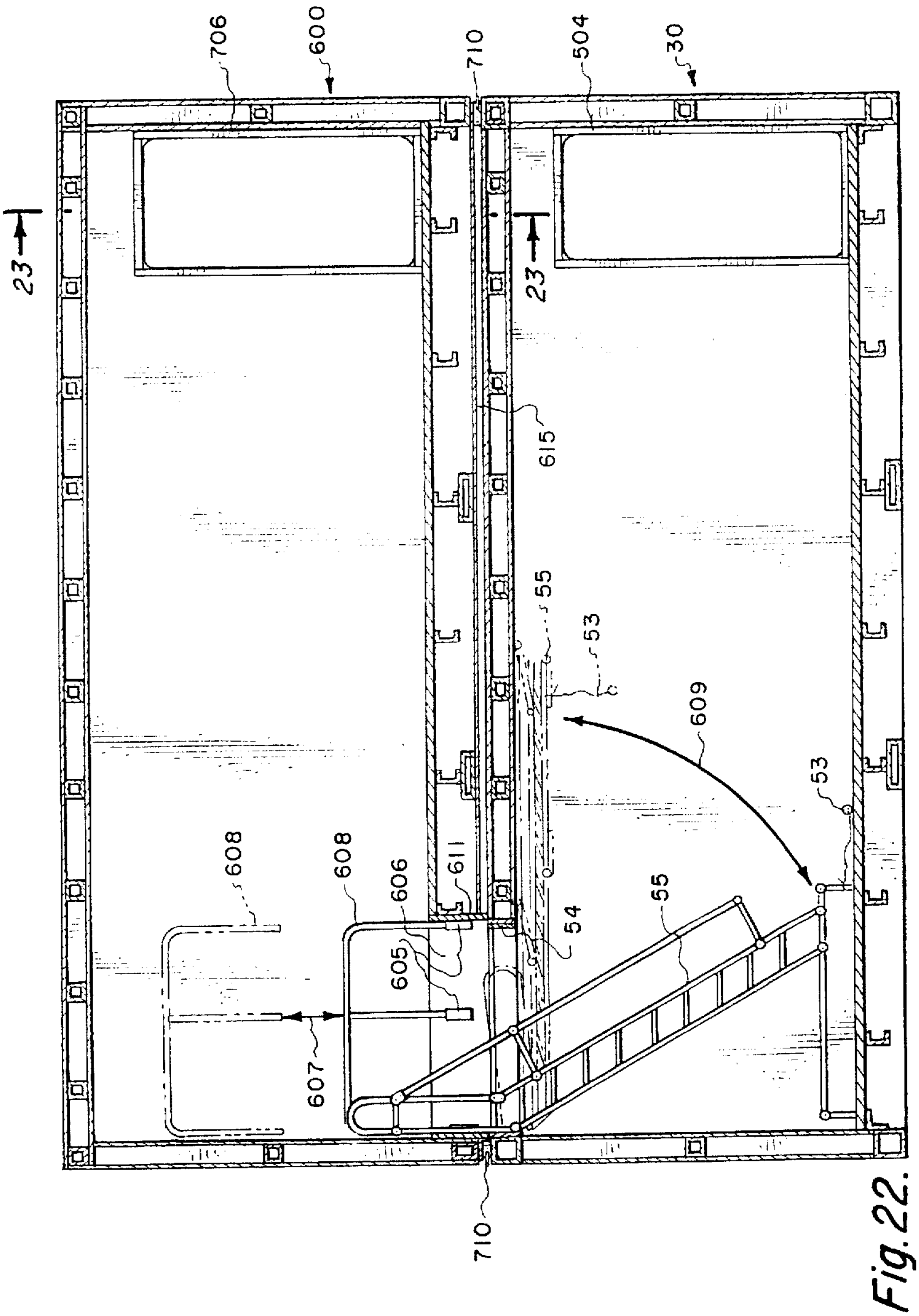
FIG. 22 is a sectional view taken along plane 22—22 of FIG. 21 of one of the modular storage units of FIG. 21 stacked on top of another of the modular storage units of FIG. 21.
Figure 24:
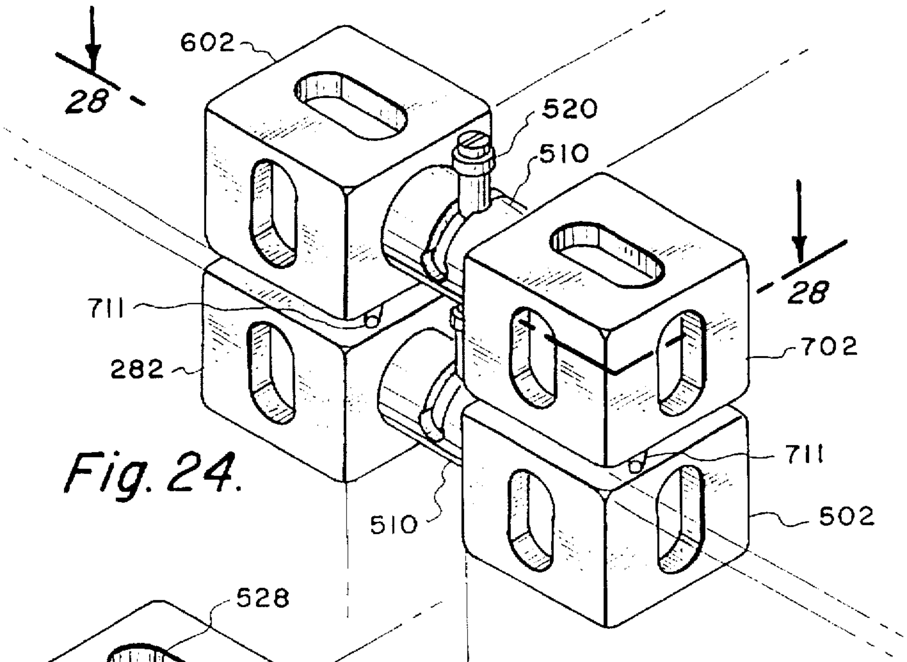
FIG. 24 is a detailed isometric view taken along line 24 of FIG. 23 illustrating a coupling assembly for securing four of the corner fittings of the four modular storage units of the modular mobile safety structure of FIG. 22.

A third embodiment of the modular mobile safety structure is illustrated generally in FIG. 22. This embodiment includes the modular storage unit 30 and modular storage unit 600 with unit 600 being stacked on top of unit 30 to form a stacked arrangement of modular storage units 30 and 600 for the treatment and handling of hazardous materials and contaminants.

Referring again to FIGS. 1 and 2, the following discussion is with respect to modular storage unit 30 which has a structure representative of the general structure of each of the modular storage units illustrated in FIGS. 19, 20, 21 and 22.

In overview, each modular storage unit including modular storage unit 30 has a base assembly 32 or skid and an assembly of upstanding walls 34, that is supported on base assembly 32. Modular storage unit 30 also includes a roof assembly 44, that is supported atop the rectangularly shaped assembly of upstanding walls 34.

The assembly of upstanding walls 34 consist of a right side wall 36, a left side wall 38, a front wall 40 and a rear wall 42. A door frame assembly 46 is incorporated into front wall 40 and pivotally mounts a door 48 which controls access to the interior 50 of modular storage unit 30.

Referring to FIGS. 1 and 19, right side wall 36 of the assembly of upstanding walls 34 also has a bellows support frame 52 which is positioned near the front end of wall 36 and through which the user of modular mobile safety structure 499 may access other modular storage units including unit 500 when the units are positioned in tandem as shown in FIG. 19. Modular storage unit 500 also includes in its left side wall a bellows support frame 506 which is in alignment with the bellows support frame 52 of unit 30 to allow the user of the modular mobile safety structure 499 in FIG. 19 to access either modular storage through a bellows 504.

Base assembly 32 of modular storage unit 30 includes four identical corner fittings/wheel support assembles 56 with one corner fitting 56 being positioned at each corner of base assembly 32. Each corner fitting 56 is adapted to receive a dual wheel caster 57 which, when affixed to modular storage unit 30 allows structure to be moved from one location to another location within, for example, a warehouse or an ocean going vessel.

The base assembly 32 of modular storage unit 30 has attached to its front end a pair of L-shaped support brackets 58 and 60 which are used as seismic tie downs allowing the front end of modular storage unit 30 to be secured to a concrete slab or the like. Similarly, there is attached to the rear end of base assembly 32 a pair of L-shaped support brackets 62 and 64 which are also adapted for securing the rear end of modular storage unit 30 to the concrete slab. Each L-shaped support bracket 58, 60, 62 and 64 has an aperture 66 through which a chain may be inserted to secure to modular storage unit 30 to the concrete slab.

As is best illustrated by FIG. 2, the corner fittings 56 at the rear end of modular storage unit 30 are also adapted to secure a tow bar 59 to modular storage unit 30 allowing unit 30 to be towed by a tow truck from one location to another location within, for example, a ship. In a like manner, the corner fittings 56 at the front end of modular storage unit 30 may also be used to secure a tow bar to modular storage unit 30. Each dual wheel caster 57 may be either pivotal of held in a fixed position depending upon the placement of the tow bar. For example, when the tow bar is secured to the rear end of modular storage unit 30 the dual wheel casters 57 at the rear end of modular storage unit 30 are pivotal, while dual wheel casters 57 at the front end of modular storage unit 30 are held in a fixed position. This, in turn, allows a tow truck to maneuver about a corner of a building or any other curved surface.

The preferred embodiment of each modular storage unit of the modular mobile safety structure of the present invention has an overall length of about 20 feet, a width of about 8 feet and a height of about 8 feet. The approximate weight of each modular storage unit is about 12,900 pounds and each modular storage unit is fabricated from steel which is fire proof and non-corrosive.

Figures 3, 6:
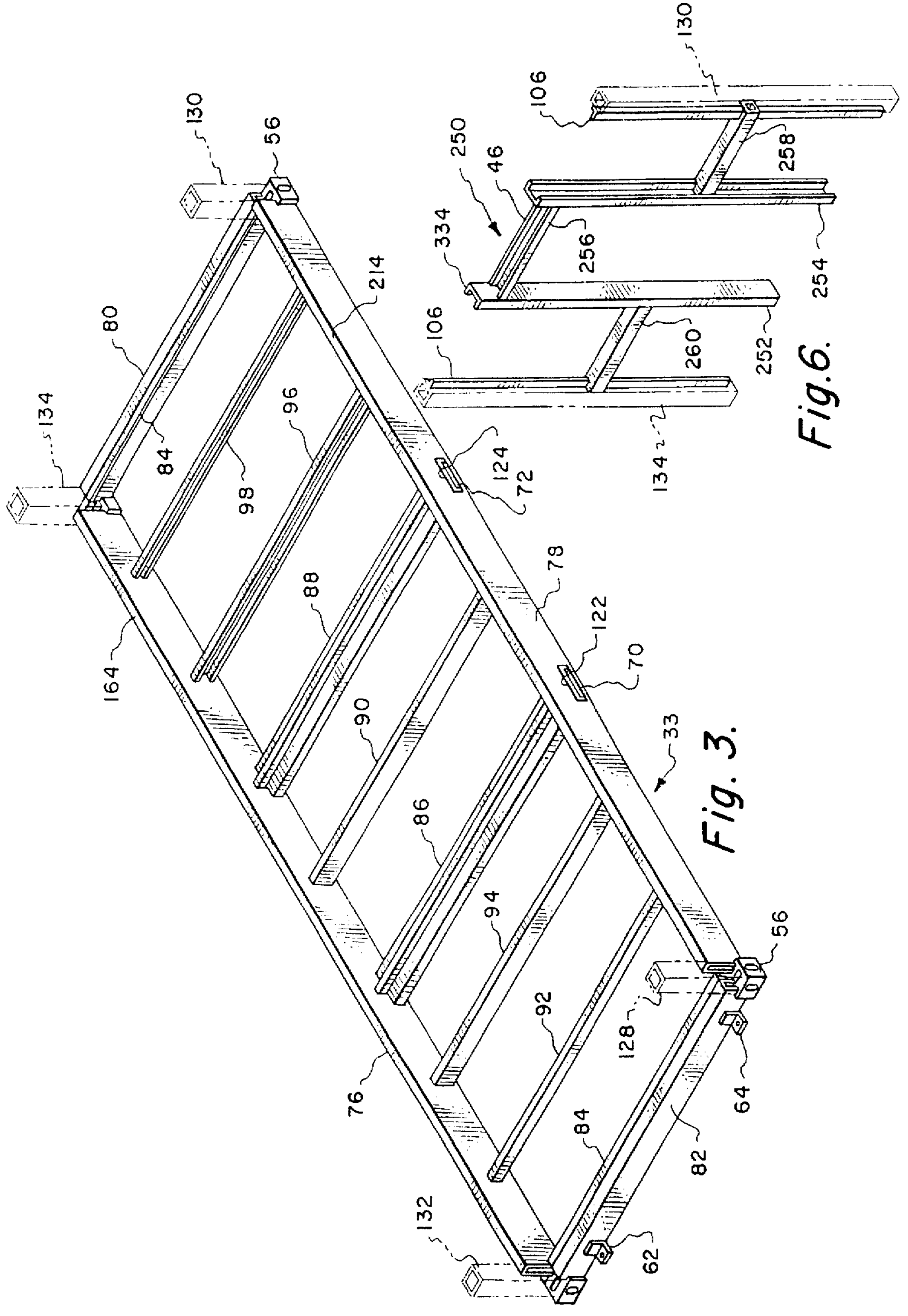
FIG. 3 is an isometric view of the framework of the base assembly for the modular storage unit of FIG. 2.
FIG. 6 is an isometric view of the wall support structure for the front wall including a door frame of the modular storage unit of FIG. 2.

Referring to FIGS. 1, 2 and 3, the interior 50 of modular storage unit 30 includes a floor 68 which is supported atop base assembly 32 and extends throughout the interior of unit 30 from the front wall 40 to the rear wall 42 and from the right side wall 36 to the left side wall 38. Floor 68 may be a grated floor fabricated from a non-spark materials such as fiberglass or aluminum. Using a grated floor allows hazardous materials which may be either liquid or solid to pass through the grated floor to a secondary containment pan located below the floor.

The base assembly 32 of modular storage unit 30 has a pair of elongated slots 70 and 72 which run the width of unit 30. The slots 70 and 72 are positioned about a center point 74 of base assembly 32 and are positioned to receive the forks of a fork lift truck (not illustrated). Specifically, the center point 74 of base assembly 32 is located about 10 feet from each corner of unit 30 and the center to center distance between slots 70 and 72 is about five feet. Placing the slots 70 and 72 about center point 74 insures that a balance load occurs on the forks of a fork lift truck when the fork lift truck moves unit 30 from a first location to a second location.

Referring again to FIGS. 1, 2, and 3 there is shown the rectangular shaped framework or support structure, designated generally by the reference numeral 33, for the base assembly 32 of modular storage unit 30. Support structure 33 includes a right side tubular support member 76 which runs the length of right side wall 36, a left side tubular support member 78 which runs the length of left side wall 38, a front end tubular support member 80 which runs the length of front wall 40 and a rear end tubular support member 82 which runs the length of rear wall 42. Front and rear end tubular support members 80 and 82 each have attached thereto by means of a weld (not shown) a floor support member 84 upon which the floor 68 of modular storage unit 30 is partially supported.

Support structure 33 has a pair of inverted T channel support members 86 and 88 which are placed perpendicular to support members 76 and 78 and are positioned about a centrally located C channel support member 90. Support Structure 33 also has a pair of C channel support members 92 and 94 placed parallel to rear end tubular support member 82 between members 82 and 86. Further, support structure 33 has a pair of C channel support members 96 and 98 placed parallel to front end tubular support member 80 between members 80 and 88.

Referring to FIGS. 2, 3, 10, 11 and 12, there is shown the corner framework for support structure 33 of base assembly 32 which joins left side tubular support member 78 to rear end tubular support member 82. For the purpose of illustration only this corner framework will be discussed since the corner framework for each of the remaining three corners of base assembly 32 is identical to the corner framework illustrated in FIGS. 11 and 12.

Figure 12:
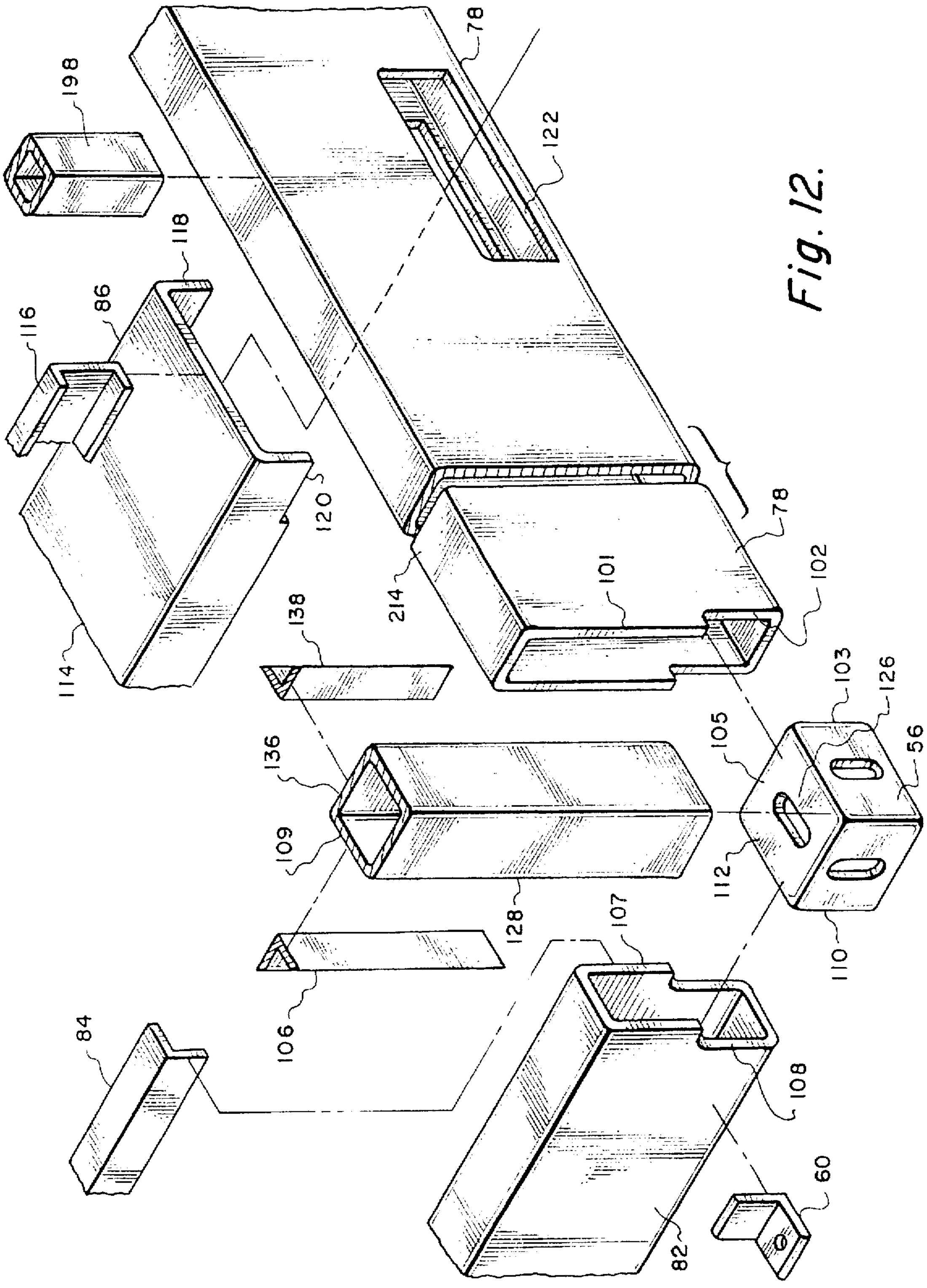
FIG. 12 is an exploded isometric view of the corner of FIG. 11.

As is best illustrated in FIG. 12, left side tubular support member 78 has at its end 101 an L shaped indent 102 which is adapted to receive a first side 103 and a top edge portion 105 of a corner fitting 56. Similarly, rear end tubular support member 82 has at its end 107 an L shaped indent 108 adapted to receive a second side 110 (angled at ninety degrees from side 103) and a top edge portion 112 of corner fitting 56. As is best illustrated in FIG. 3, when attached to corner fitting 56, members 78 and 82 form a corner of base assembly 32. The remaining three corners of base assembly 32 are formed in an identical manner using a corner fitting of the type illustrated in FIG. 12 which results in base assembly 32 having a rectangular shape. Members 78 and 82 are attached to corner fitting 56 by means of welds (not shown).

At this time, it should be noted that left side tubular support member 78 and rear end tubular support member 82 are fabricated from structural tubular steel which is non-corrosive and chemical resistant. Similarly right side tubular support member 80 and front end tubular support member 82 are also fabricated from 12 gauge structural tubular steel.

Inverted T channel support members 86 and 88 are formed by base channel member 114 and a floor support channel member 116 mounted on top of member 114 and secured thereto by means of a weld (not shown). Channel member 114 and 116 are also fabricated from 12 gauge structural tubular steel which is non-corrosive and chemical resistant. Base channel member 114 of inverted T channel support members 86 and 88 has at each end 118 on the bottom portion thereof an L shaped indent 120.

Figures 4, 5:
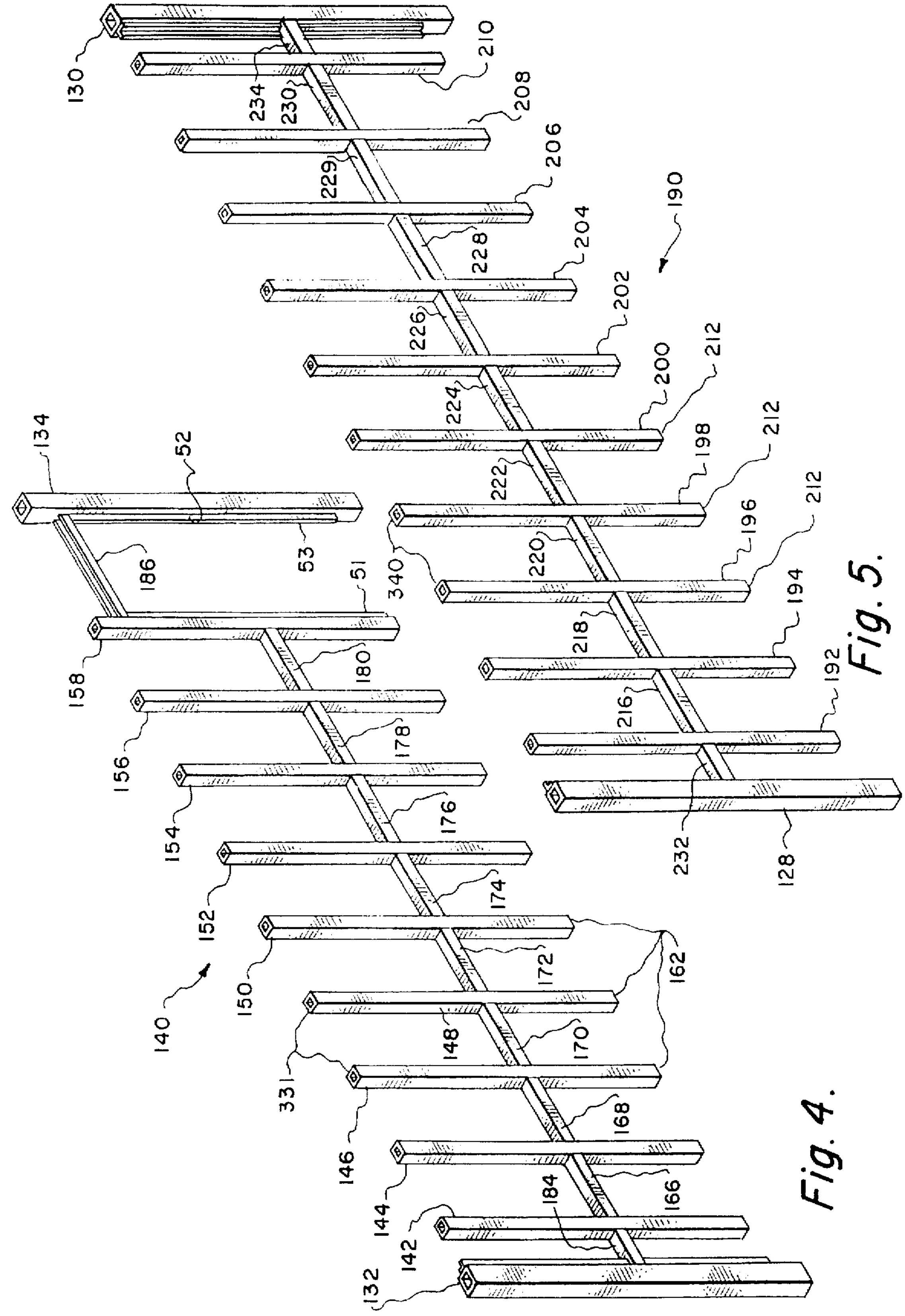
FIG. 4 is an isometric view of the wall support structure for the right side wall of the modular storage unit of FIG. 2.
FIG. 5 is an isometric view of the wall support structure for the left side wall of the modular storage unit of FIG. 2.

Referring to FIGS. 2, 10, 11 and 12 left side tubular support member 78 has a pair of rectangular shaped openings 122 and 124. One of the openings 124 receives and then secures end 118 including L shaped indent 120 of T channel support member 88 to left side tubular support member 78, while the other opening 122 receives and then secures end 118 including L shaped indent 120 of T channel support member 86 to left side tubular support member 78. The opposite ends 118 of inverted T channel support members 86 and 88 are secured to right side tubular support member 76 in exactly the same manner as illustrated in FIGS. 4 and 5.

There is mounted on a top center portion 126 of corner fitting 56 a tubular corner support member 128, which is rectangular in shape and which is secured to corner fitting 56 by means of a weld (not shown). Corner support member 128 is also attached to rear end tubular support member 82 and left side tubular support member 78 by means of welds (not shown).

As shown in phantom in FIG. 3, there is located at each of the remaining corners of base assembly 32 a corner support member identical to corner support member 128 with each corner support member extending upward from base assembly. Specifically, the left front corner of base assembly 32 has a corner support member 130 which extends upward from base assembly 32, the right rear corner of base assembly 32 has a corner support member 132 which extends upward from base assembly 32 and the right front corner of base assembly 32 has a corner support member 134 which extends upward from base assembly 32. Each corner support member 128, 130, 132 and 134 has welded to an inner side 136 a corner brace 138. Each corner support member 128, 130, 132 and 134 also has welded to an inner side 109 a corner brace 106.

Referring to FIGS. 1, 3, 4 and 9, there is shown the rectangular shaped framework or support structure, designated generally by the reference numeral 140, for the right side wall 36 of modular storage unit 30. Framework 140 includes a plurality of tubular wall support members 142, 144, 146, 148, 150, 152, 154, 156 and 158 which extend upwardly from right side tubular support member 76. Framework 140 also includes bellows support frame 52 which comprises a pair of elongated support members 51 and 53 and a cross channel support member 186. Member 53 may be, for example, an L shaped steel brace attached to corner support member 134 which runs approximately the length of member 134, while member 51 may be an L shaped steel brace attached to tubular wall support member 158 which runs approximately the length of member 158. Support member 186 has one end thereof affixed to tubular wall support member 158 and the opposite end thereof affixed to corner support member 134 by means of welds (not shown).

Figure 9:
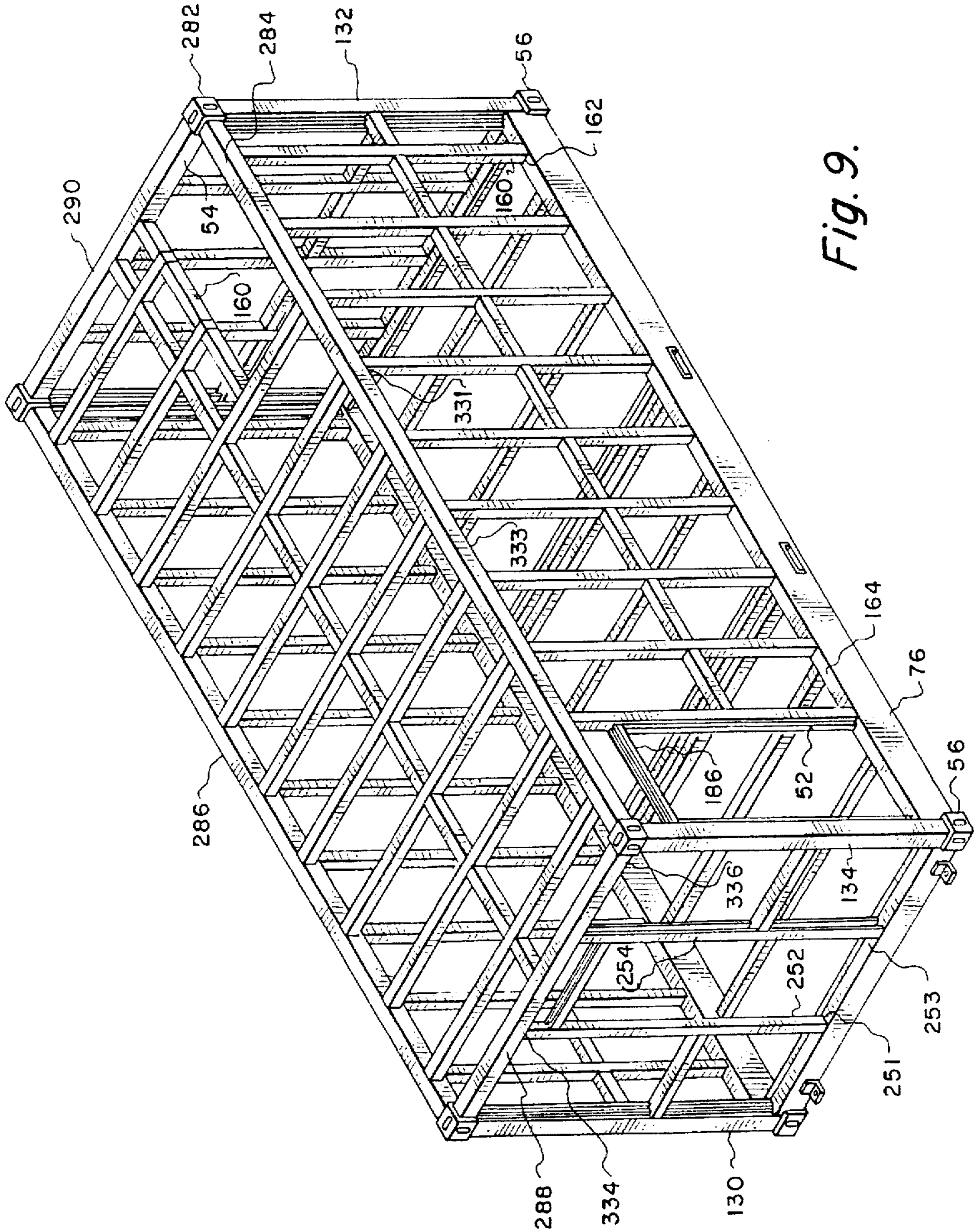
FIG. 9 is an isometric view of the framework for the modular storage unit of FIG. 1.

As is best illustrated in FIG. 9, each tubular wall support member 142–158 has its lower ends 162 attached to the top 164 of member 76 by means of a weld (not shown). Tubular cross braces 166, 168, 170, 172, 174, 176, 178, and 182 are interposed between their two associated adjacent tubular wall support members 142–158. In a like manner a tubular cross brace 184 is interposed between corner support member 132 and tubular wall support member 142. Welds (not shown) secure each end of the cross braces 166–180 and 184 to its associated wall support member 142–160 or corner support member 132.

Figure 10:
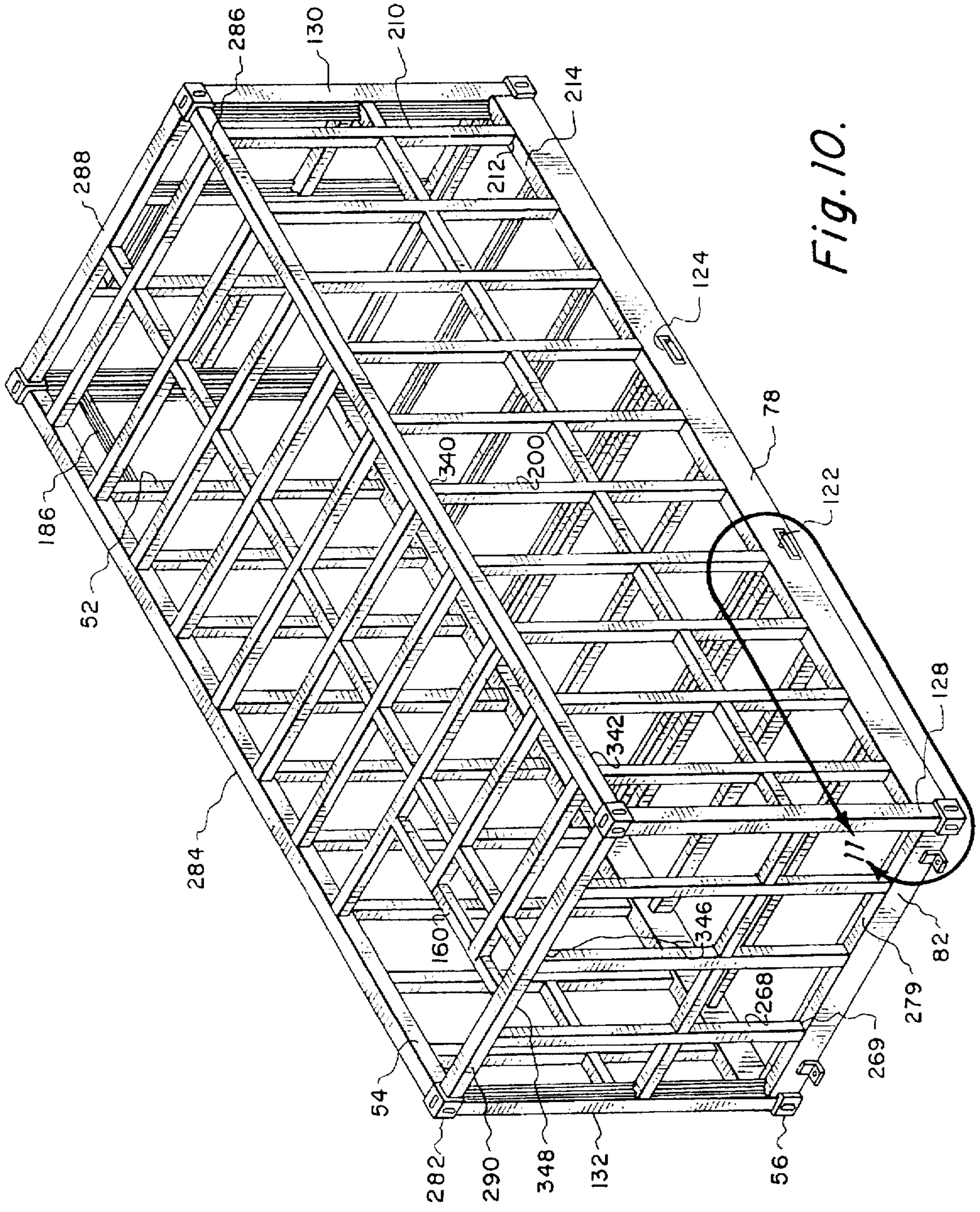
FIG. 10 is an alternate isometric view of the framework for the modular storage unit of FIG. 2.
Figure 11:
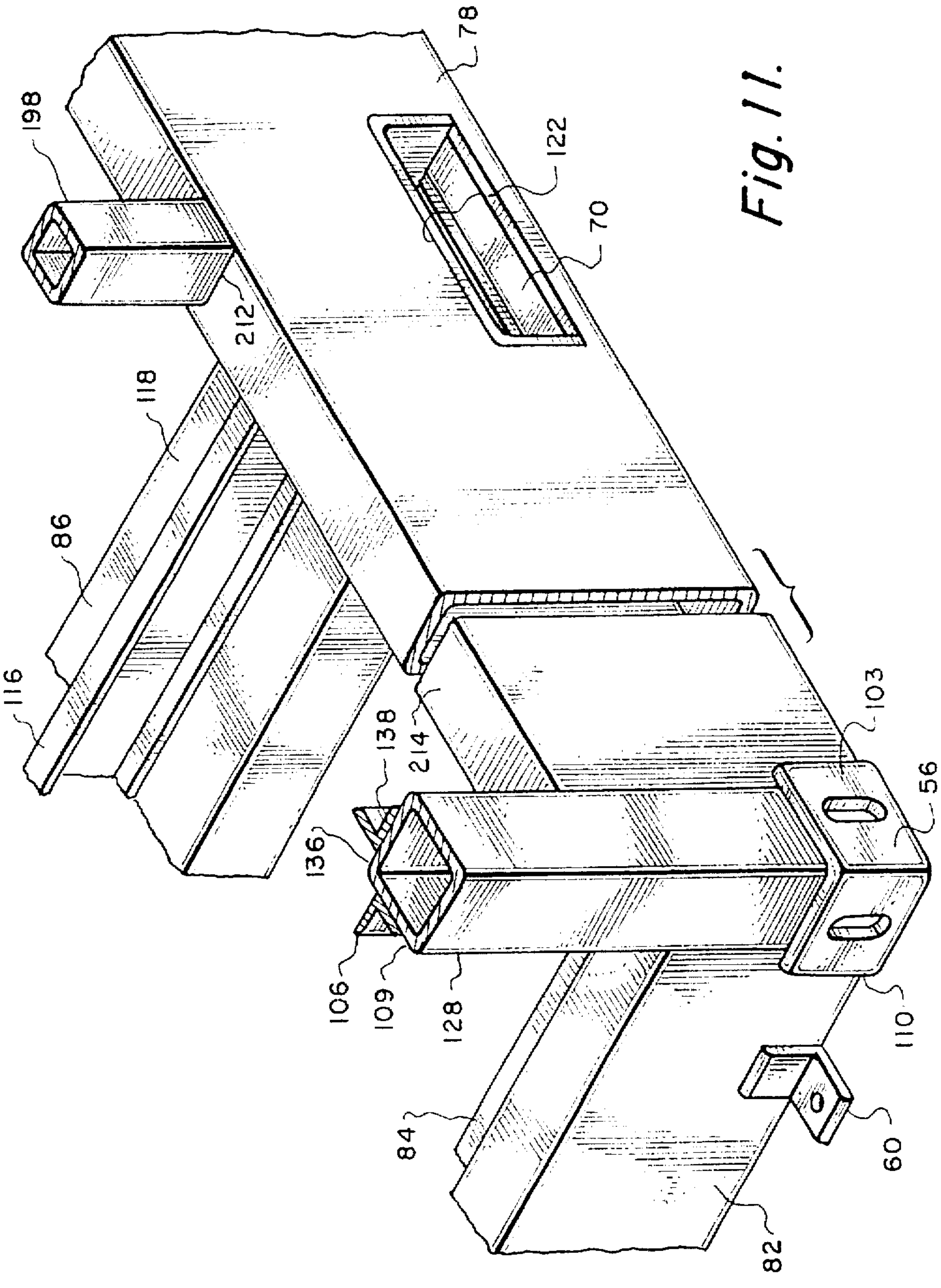
FIG. 11 is an isometric view of a corner taken along line 11 of FIG. 10 for the base assembly of the modular storage unit of FIG. 2.

Referring to FIGS. 2, 3, 5 and 10, there is shown the rectangular shaped framework or support structure, designated generally by the reference numeral 190, for the left side wall 38 of modular storage unit 30. Framework 190 includes a plurality of tubular wall support members 192, 194, 196, 198, 200, 202, 204, 206, 208 and 210 which extend upwardly from left side tubular support member 78. As is best illustrated in FIGS. 10 and 11, each tubular wall support member 192–210 has its lower ends 212 attached to the top 214 of member 78 by means of a weld (not shown). Tubular cross braces 216, 218, 220, 222, 224, 226, 228, 229 and 230 are interposed between their two associated adjacent tubular wall support members 192–210. In a like manner a tubular cross brace 232 is interposed between corner support member 128 and tubular wall support member 192, while a tubular cross brace 234 is interposed between corner support member 130 and tubular wall support member 210. Welds (not shown) secure each end of the cross braces 216–234 to its associated wall support member 192–210 or corner support member 128 and 130.

Referring to FIGS. 2, 3, 6 and 10, there is shown the rectangular shaped framework or support structure, designated generally by the reference numeral 250, for the front wall 40 of modular storage unit 30. Support structure 250 includes door frame assembly 46 consisting of a pair of channels members 252 and 254 which extend upwardly from base assembly 32. Channel members 252 and 254 each have their lower end 251 attached to the top 253 of front end tubular support member 80 of base assembly by means of welds (not shown). Door frame assembly 46 also includes a cross channel member 256 interposed between channel members 252 and 254 located at the top of door frame assembly 46. Support structure 250 also includes a tubular cross brace 258 interposed between channel member 254 and corner support member 130 and a tubular cross brace 260 interposed between channel member 252 and corner support member 134. Cross braces 258 and 260 are coupled to their associated channel members 252 and 254 and corner support members 130 and 134 by means of welds (not shown).

Referring to FIGS. 2, 3, 7 and 10, there is shown the rectangular shaped framework or support structure, designated generally by the reference numeral 262, for the rear wall 42 of modular storage unit 30. Support structure 262 includes a plurality of tubular wall support members 264, 266 and 268 which extend upwardly from base assembly 32. Tubular wall support members 264, 266 and 268 are attached to rear end tubular support member 82 of base assembly 32 by means of welds (not shown). Support structure 262 also includes a plurality of tubular cross braces 272, 274, 276 and 278. Cross brace 272 is interposed between corner support member 128 and wall support member 264, cross brace 274 is interposed between adjacent wall support members 264 and 266, cross brace 276 is interposed between adjacent wall support members 266 and 268 and cross brace 278 is interposed between corner support member 132 and wall support member 268. Cross braces 272, 274, 276 and 278 are coupled to their associated wall support members 264, 266 and 268 and corner support members 128 and 132 by means of welds (not shown).

As is best illustrated in FIG. 10, each tubular wall support member 264, 266 and 268 has its lower ends 269 attached to the top 279 of member 82 by means of a weld (not shown).

Figures 7, 8:
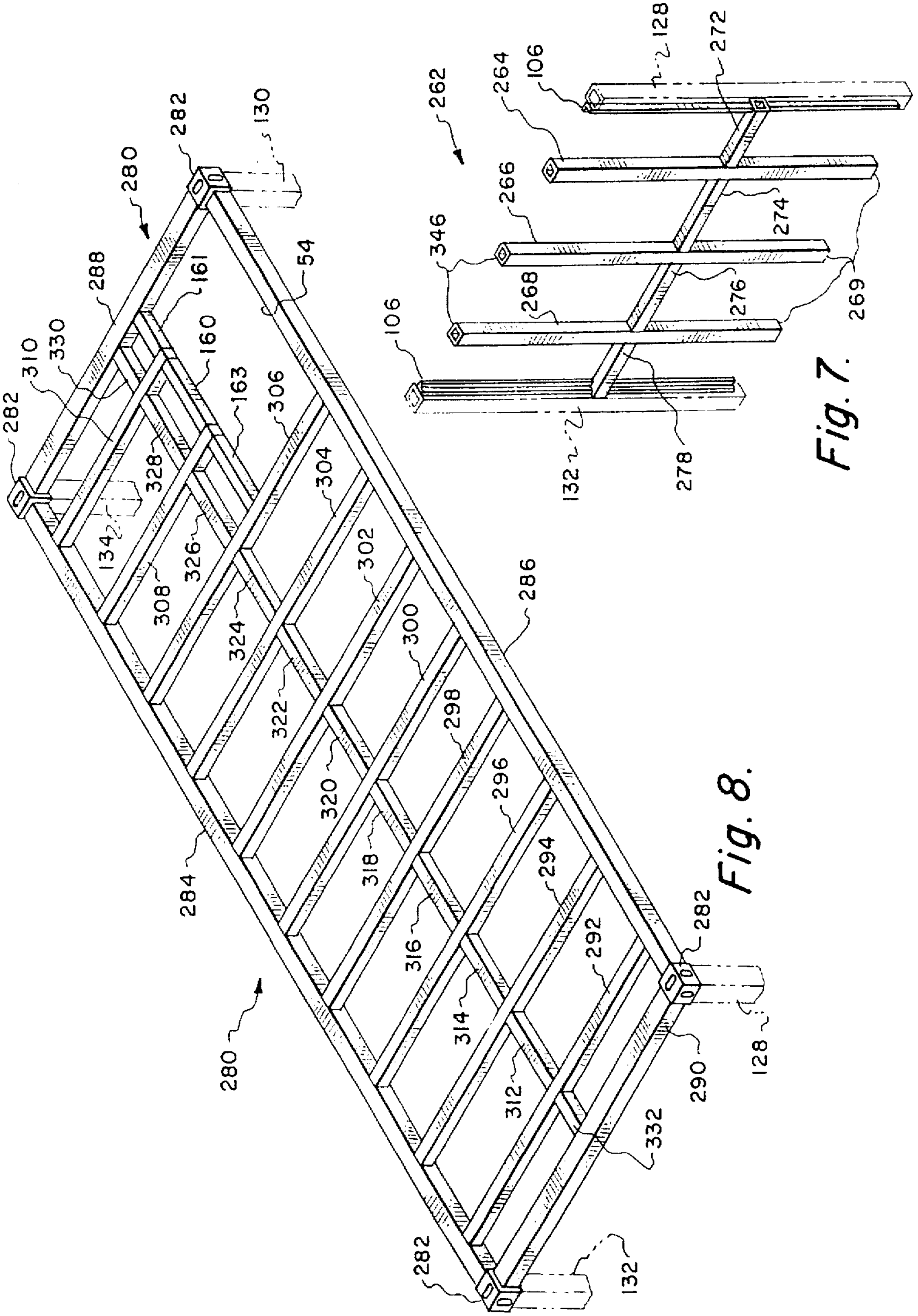
FIG. 7 is an isometric view of the wall support structure for the rear wall of the modular storage unit of FIG. 2.
FIG. 8 is an isometric view of the roof support structure for the roof assembly of the modular storage unit of FIG. 2.

Referring to FIGS. 2, 8 and 10, there is shown the rectangular shaped framework or support structure, designated generally by the reference numeral 280, for the roof assembly 44 of modular storage unit 30. Support structure 280 (FIG. 8) includes four corner fittings 282 with one corner fitting being positioned at each corner of roof assembly 44 (FIGS. 1 and 2). Support structure 280 also includes a right side tubular support member 284 which runs the length of right side wall 36, a left side tubular support member 286 which runs the length of left side wall 38, a front end tubular support member 288 which runs the length of front wall 40 and a rear end tubular support member 290 which runs the length of rear wall 42. Support members 284, 286, 288 and 290 are attached to their associated corner fittings 282 by means of welds (not shown). Corner support members 128, 130, 132 and 134 are also attached to their associated corner fittings 282 by means of welds (not shown).

The corner fittings 56 and 282 used at each corner of base assembly 32 and roof assembly 44 of mobile safety structure 30 are cast steel iso type corner fittings, model no. 72043-VS, manufactured by Tandemloc, Inc. of Ronkonkoma, N.Y.

Support structure 280 has a plurality of tubular roof support members 292, 294, 296, 298, 300, 302, 304, 306, 308 and 310 which are positioned parallel to front and rear end tubular support members 288 and 290. Tubular roof support members 292, 294, 296, 298, 300, 302, 304 and 306 extend from right side tubular support member 284 to left side tubular support member 286. Tubular roof support members 308 and 310 extend from right side tubular support member 284 to the edge of a rectangular shaped ladder support frame (designated generally by the reference numeral 54).

Tubular cross braces 312, 314, 316, 318, 320, 322, 324, 326 and 328 are interposed between their two associated adjacent tubular roof support members 292, 294, 296, 298, 300, 302, 304, 306, 308 and 310. In a like manner a tubular cross brace 330 is interposed between front end tubular support member 288 and roof support member 310 and a tubular cross brace 332 is interposed between rear end tubular support member 290 and roof support member 292. The right and left ends of tubular support members 292–306 are respectively attached to right side tubular support member 284 and left side tubular support member 286 by means of welds (not shown). Tubular cross braces 312–332 are also attached to their associated roof support members 292–310 and front and rear end tubular support members 288 and 290 by means of welds (not shown). The right end of tubular support members 308 and 310 are attached to right side tubular support member 284 by means of welds (not shown).

Rectangular shaped ladder support frame 54, which provides a support structure for a pull down safety ladder 55 (illustrated in FIG. 22) includes tubular support members 160, 161 and 163 as well as a portion of support members 286, 288 and 306. Each connection of the support members comprising ladder support frame 54 is by means of a weld (not illustrated).

As shown in phantom in FIG. 8 each tubular corner support member 128, 130, 132 and 134 is affixed to one of the four corner fittings 282 of support structure 280 and secured to its associated corner fitting 282 by means of a weld (not shown).

Referring to FIGS. 4, 6 and 9 each tubular wall support member 142–158 of support structure 140 has its upper ends 331 attached to the bottom 333 of right side tubular support member 284 by means of a weld (not shown). In a like manner, each channel member 252 and 254 of support structure 250 has its upper end 334 attached to the bottom 336 of front end tubular support member 288 by means of a weld (not shown).

Referring to FIGS. 5, 7 and 10 each tubular wall support member 192–210 of support structure 190 has its upper end 340 attached to the bottom 342 of left side tubular support member 286 by means of a weld (not shown). In a like manner, each tubular wall support member 264, 266 and 268 of support structure 262 has its upper 346 attached to the bottom 348 of rear end tubular support member 290 by means of a weld (not shown).

At this time it should be noted that each tubular wall support member, tubular cross brace and channel member of support structures 140, 190, 250 and 262 is fabricated tubular steel which is fire proof and non-corrosive.

Referring to FIGS. 1, 2, 5, 7 and 13, there is shown a corner view of the structure of rear wall 42 and left side wall 38 including tubular corner support member 128. The outer wall 349 of left side wall 38 comprises a plurality of rectangular shaped steel wall panels 350 which are attached to the wall supports 192–210 and cross braces 216–232 of support structure 190 by means of plugs welds 352. Similarly, the outer wall 354 of rear wall 42 comprises at least one rectangular shaped wall panel 356 which is attached to the wall supports 264, 266 and 268 and cross braces 272–278 of support structure 162 by means of plug welds 352. Each wall panel 350 and 356 is fabricated from 10 gauge steel plate.

Referring now to FIG. 1, it should be noted that front wall 40 has at least one rectangular shaped panel 358 of 10 gauge steel plate which comprises its outer wall 359 and right side wall 36 has a plurality of rectangular shaped steel wall panels 388 which comprises its outer wall 361. Adjacent rectangular shaped steel wall panels of each outer wall 349, 354, 359 and 361 are joined by continuous welds 362.

Figure 13:
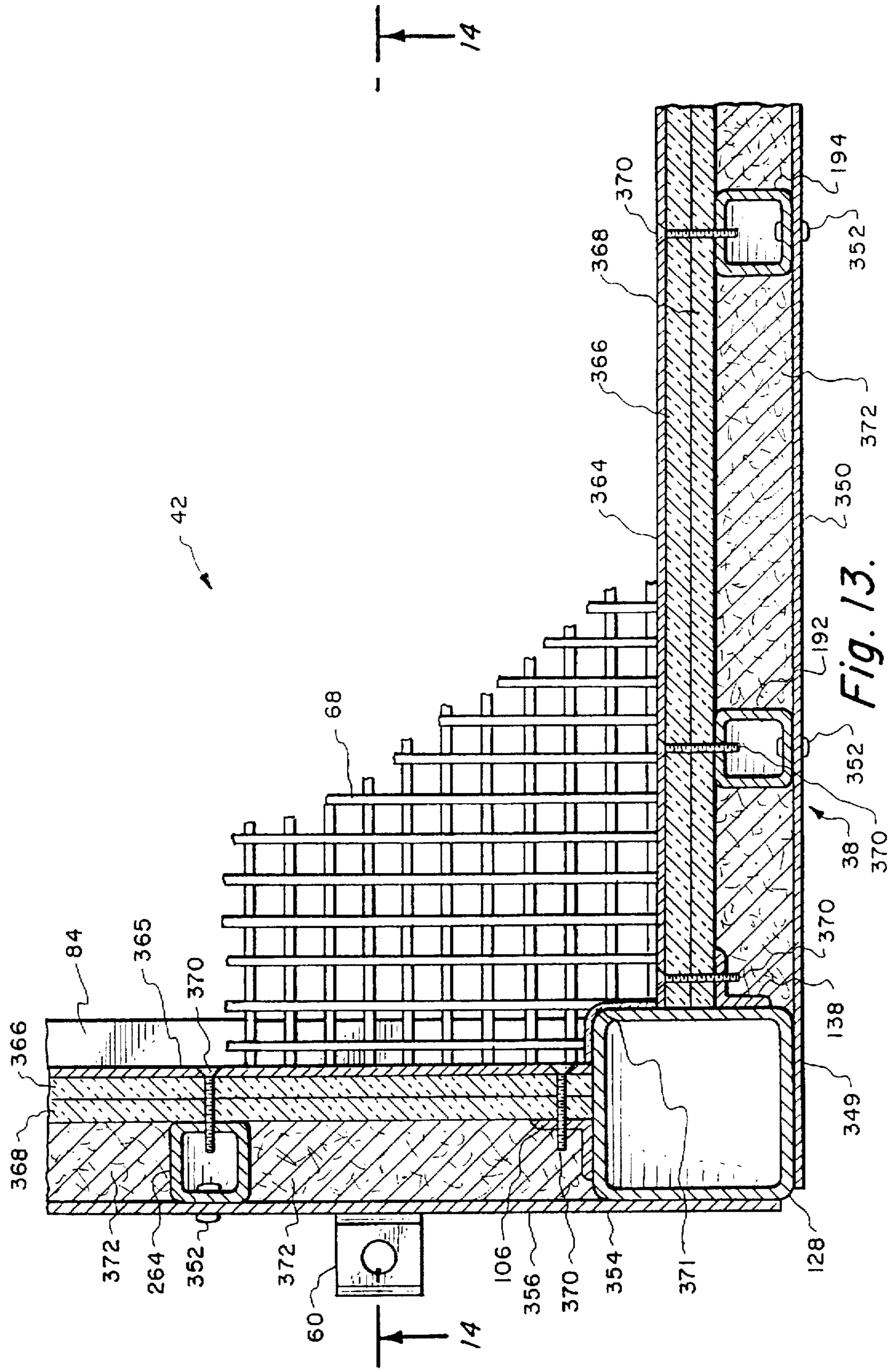
FIG. 13 is a sectional view of a corner of the modular storage unit of FIG. 2 taken along the plane 13—13 of FIG. 2.

Referring to FIGS. 1, 5, 7, 13 and 18 left side wall 38 and rear wall 42 respectively include inner wall panels 364 and 365 fabricated from 18 gauge steel plate and at least two stacked sheets 366 and 368 of ¾ inch of ULTRACODE Core gypsum board fabricated by U.S. Gypsum Company of Chicago, Ill. Utilizing the double layer construction of gypsum board illustrated in FIG. 13 provides for a four hour fire rating. The gypsum boards 366 and 368 are stacked with the interior board being designated as 366 and the exterior board being designated as 368.

It should be noted that corner support member 128 (FIG. 13) as well as corner support members 130, 132 and 134 (FIG. 3) have a fire proof material 371 attached to their exposed interior surface as shown in FIG. 13 for the exposed interior surface of corner support member 128.

Figure 18:
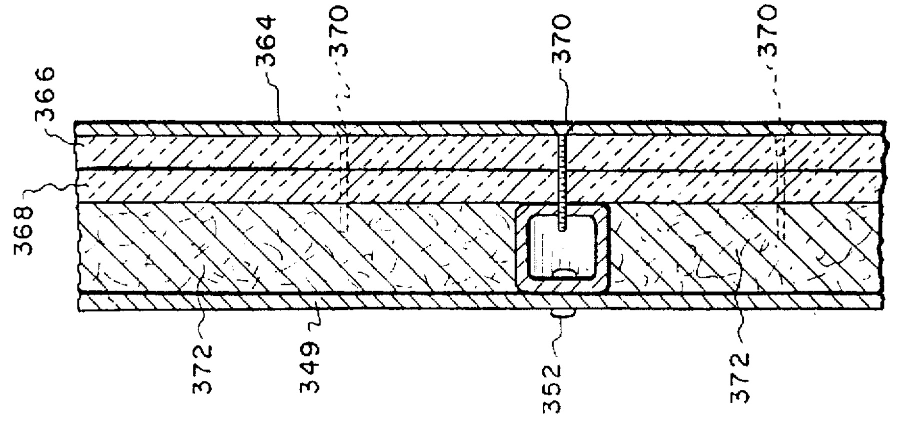
FIG. 18 is another sectional view of the left side wall of the modular storage unit of FIG. 2 taken along the plane 18—18 of FIG. 2.

As shown in FIGS. 13 and 18, the stacked gypsum boards 366 and 368 and steel plate 364 of left side wall 38 are supported against and secured to the tubular wall support members 192 and 194 and corner brace 138 of corner support member 128 by stainless steel self-tapping screws 370. Similarly, as shown in FIG. 13, the stacked gypsum boards 366 and 368 and steel plate 365 of rear wall 42 are supported against and secured to the tubular wall support member 264 and corner brace 106 of corner support member 128 by stainless steel self-tapping screws 370.

Left side wall 38 of modular storage unit 30 also has a layer of fiberglass insulation 372 (rated R-19) sandwiched between gypsum board 368 and its outer wall 349. Similarly, rear wall 42 has a layer of fiberglass installation 372 (rated R-19) sandwiched between gypsum board 368 and its outer wall 354.

Figure 14:
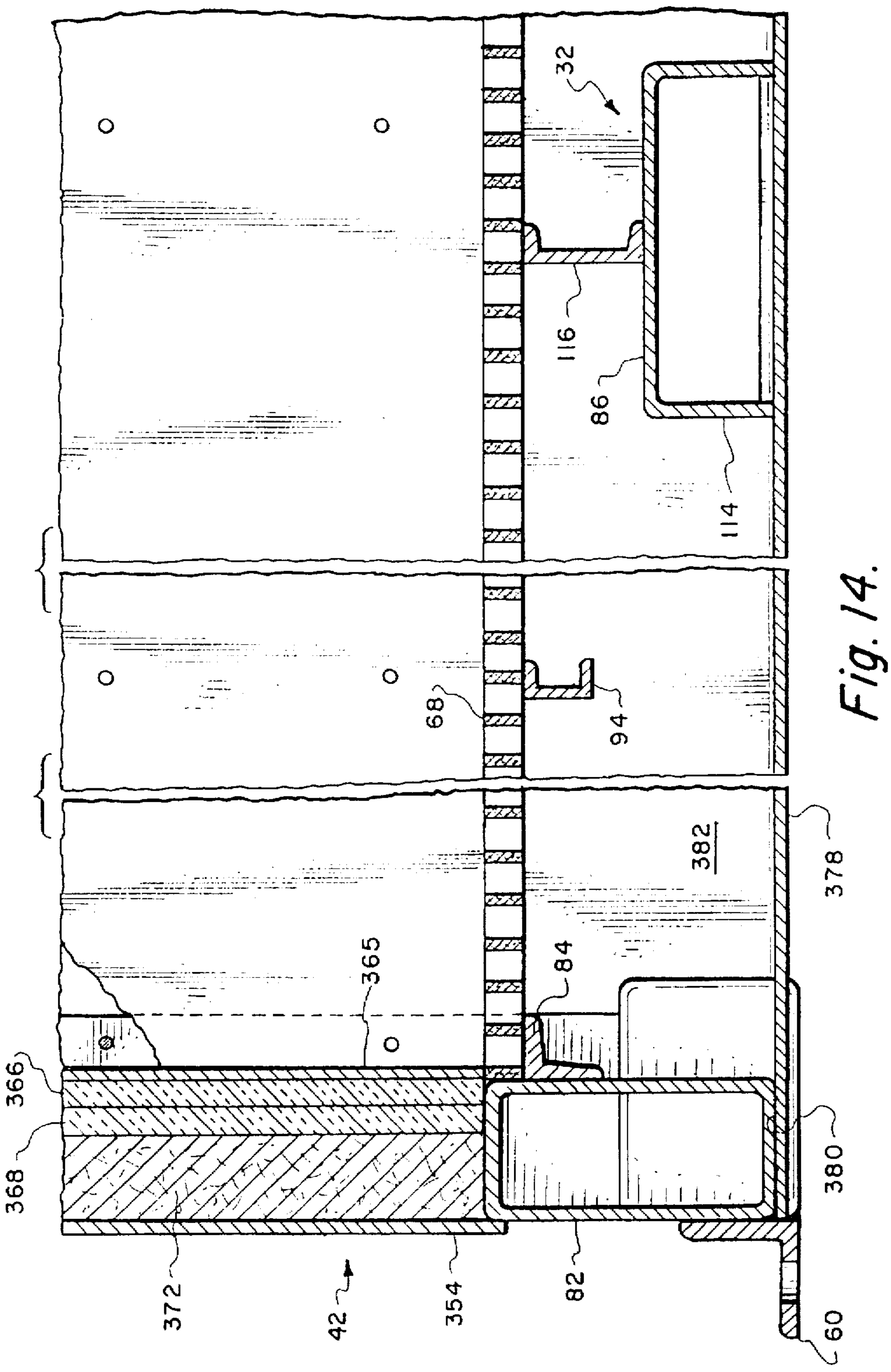
FIG. 14 is a sectional view of the base assembly and floor of the modular storage unit of FIG. 2 taken along the plane 14—14 of FIG. 13.

Referring to FIGS. 2, 3 and 14, modular storage unit 30 includes floor 68 which is supported atop base assembly 32 and extends throughout the interior of unit. Attached to the bottom of base assembly 32 is a generally rectangular shaped steel base plate 378 fabricated of 10 gauge steel plate which is non-corrosive and fire resistant. Base plate 378 extends the length and the width of modular storage unit 30.

As shown in FIG. 14, base plate 378 is secured to the bottom surface 380 of rear end tubular support member 82 and the base channel member 114 of inverted T channel support member 86 by means of a continuous welds (not shown). Base plate 378 is also secured to right side tubular support member 76, left side tubular support member 78, front end tubular support member 80 and inverted T channel support member 88 by continuous welds in the same manner as illustrated in FIG. 14.

Referring to FIGS. 3 and 14, the preferred embodiment contemplates a removable grating type structure for floor 68 which rest upon floor support members 84, C channel support members 92, 94, 96 and 98 and the floor support channel member 116 of inverted T channel support members 86 and 88. The removable grating structure 68 may be sectional to allow a particular portion of the grating structure 68 to be removed while maintaining the rest of the grating structure 68 as the floor of mobile safety structure 30. The removable grating structure 68 may also cover about two thirds of the floor, while the remainder of the floor may be a solid fiberglass structure.

Containers of hazardous materials (not shown) including, for example, 10 gallon drums are stored in modular storage unit 30. These containers may not be properly sealed which will cause spillage or leakage from the containers. To facilitate such spillage or leakage from these containers of hazardous materials within modular storage unit 30, a containment pan 382 is located below the removable grating which constitutes floor 68. The containment pan 382 is provided with a bottom which is base plate 378, sides which are members 76, 78, 80 and 82 and a top which is floor 68. The containment pan 382 is also partition into three sections by members 86 and 88.

By utilizing a removable floor 68 within unit 30, the user of unit 30 may determine whether a spillage or leakage of a hazardous material has occurred from containers stored within unit 30 by visually inspecting containment pan 382. The removable floor 68 within modular storage unit 30 also facilitates the removal of hazardous materials from containment pan 382 should the hazardous materials be of such nature so as to warrant their removal from modular storage unit 30.

Figure 16:
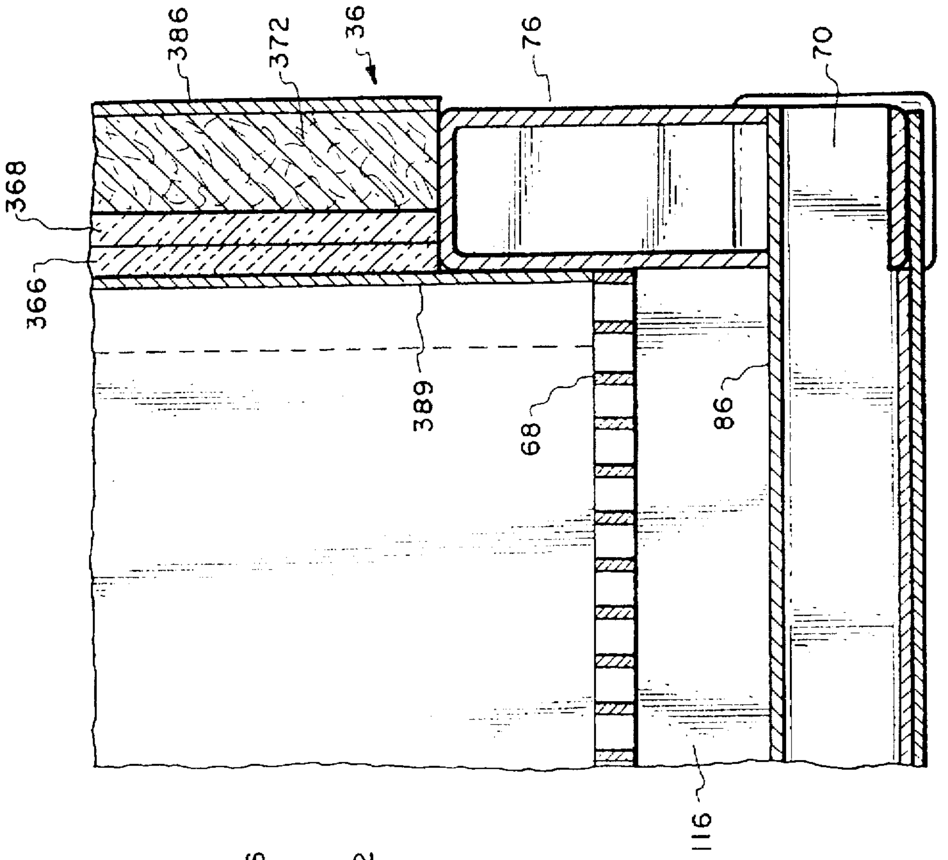
FIG. 16 is a another sectional view of the base assembly, floor and right side wall of the modular storage unit of FIG. 1 taken along the plane 16—16 of FIG. 1.
Figure 15:
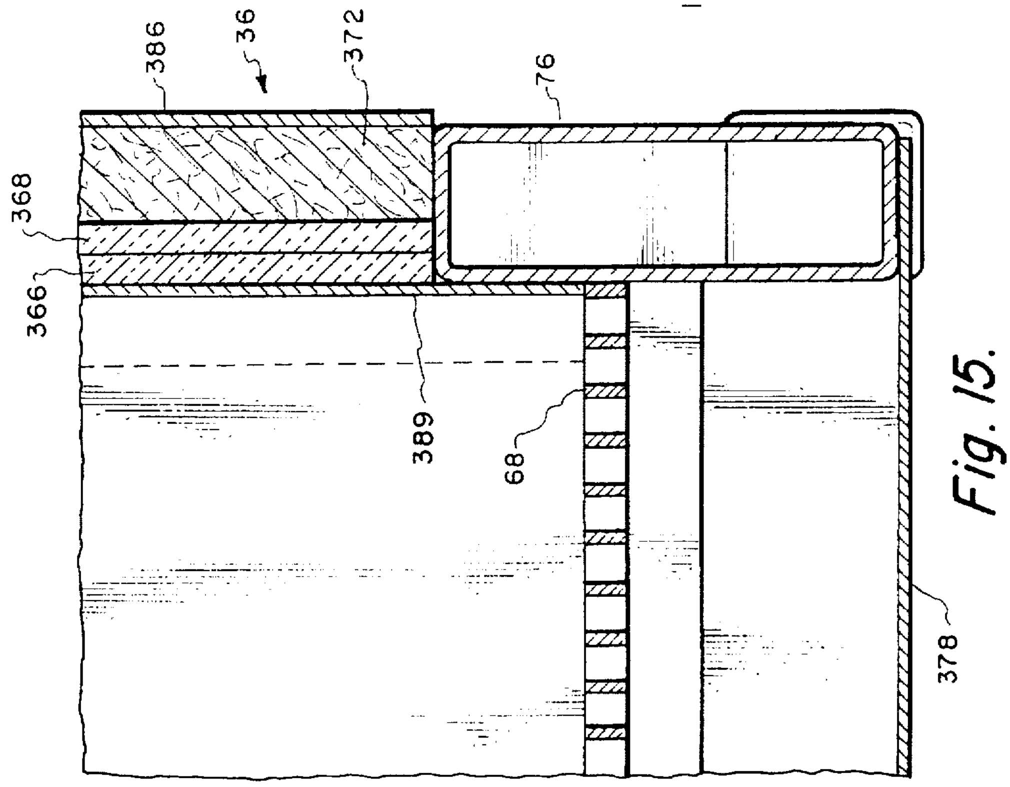
FIG. 15 is a sectional view of the base assembly, floor and right side wall of the modular storage unit of FIG. 1 taken along the plane 15—15 of FIG. 1.

Referring now to FIGS. 1, 13, 15 and 16, right side wall 36 is fabricated in exactly the same manner as left side wall 38 and rear wall 42. Specifically, right side wall 36 includes an outer wall 386 comprising a plurality of rectangular shaped steel wall panels 388 which are attached to the wall supports 142–158 and cross braces 166–184 of support structure 140 (FIG. 4) by means of plugs welds. Right side wall 36 also has an inner wall panel 389 of 18 gauge steel plate and at least two stacked sheets 366 and 368 of ¾ inch of ULTRACODE Core gypsum board. Utilizing the double layer construction of gypsum board illustrated in FIGS. 15 and 16 provides for a four hour fire rating. Right side wall 36 of modular storage unit 30 also has a layer of fiberglass installation 372 (rated R-19) sandwiched between gypsum board 368 and its outer wall 386.

Figure 17:
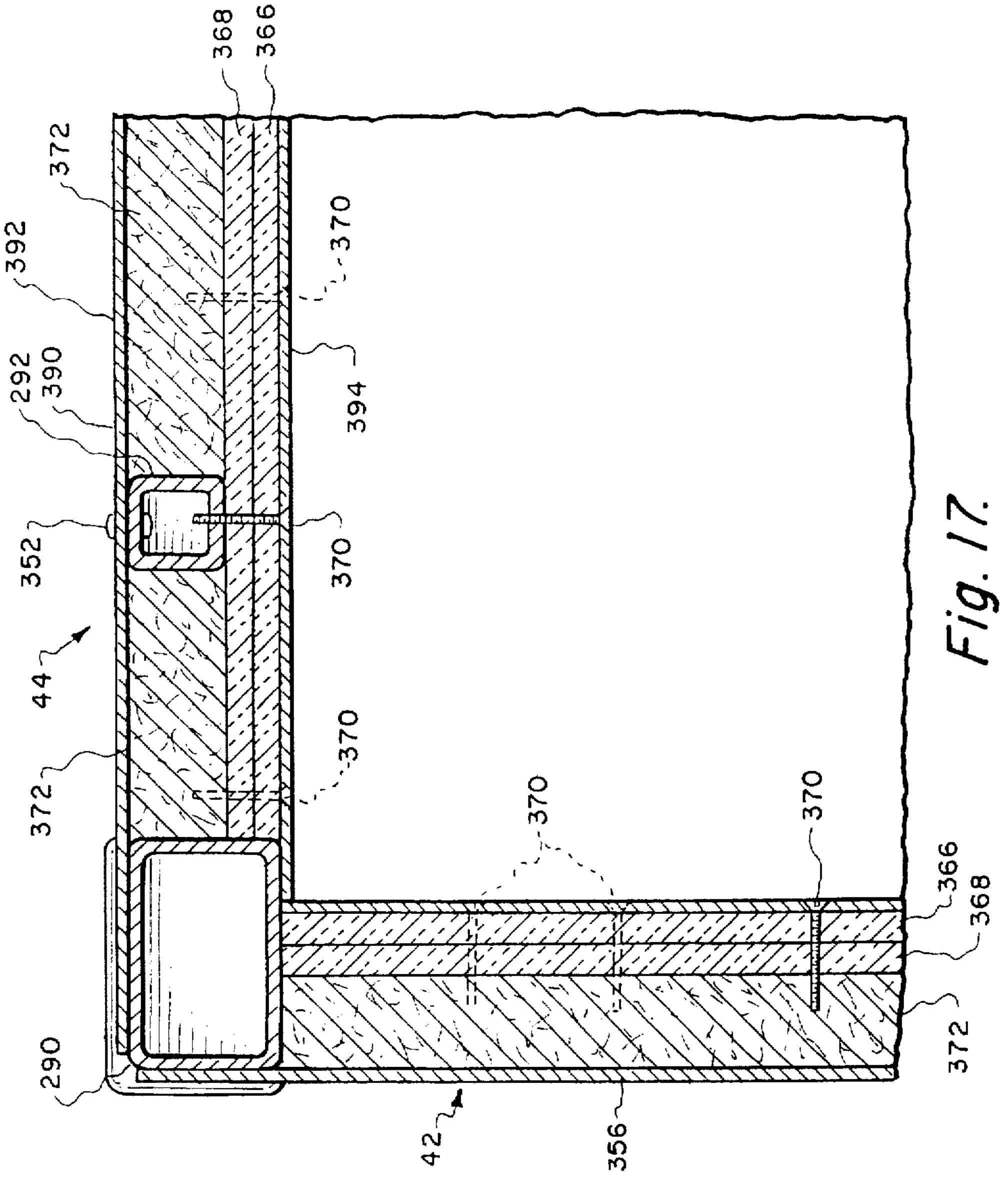
FIG. 17 is a sectional view of the rear wall and roof assembly of the modular storage unit of FIG. 2 taken along the plane 17—17 of FIG. 2.

Referring to FIGS. 2, 8 and 17, roof assembly 44 is fabricated in exactly the same manner as right side wall 36, left side wall 38 and rear wall 42. Specifically, roof assembly 44 includes an outer wall 390 comprising a plurality of rectangular shaped steel wall panels 392 which are attached to the wall supports 292–310 and cross braces 312–332 of support structure 280 (FIG. 8) by means of plugs welds 352. Roof assembly 44 also has an inner wall panel 394 of 18 gauge steel plate and at least two stacked sheets 366 and 368 of ¾ inch of ULTRACODE Core gypsum board. Utilizing the double layer construction of gypsum board illustrated in FIGS. 17 provides for a four hour fire rating. Roof assembly 44 of modular storage unit 30 also has a layer of fiberglass installation 372 (rated R-19) sandwiched between gypsum board 368 and its outer wall 390. As shown in FIG. 17, the stacked gypsum boards 366 and 368 and steel plate 394 of roof assembly 44 are supported against and secured to the tubular wall roof member 292 by stainless steel self-tapping screws 370.

It should be noted that front wall 40 is fabricated in exactly the same manner as right side wall 36, left side wall 38 and rear wall 42. Specifically, front wall 40 includes an outer wall comprising at least rectangular shaped panel 358 (FIG. 1) of 10 gauge steel plate which comprises its outer wall 359 (FIG. 1). Wall panel 358 which is attached to the channels members 252 and 254 and cross braces 258 and 260 of support structure 250 (FIG. 6) by means of plugs welds (not illustrated). Front wall 40 also has an inner wall panel of 18 gauge steel plate and at least two stacked sheets of ¾ inch of ULTRACODE Core gypsum board. Utilizing the double layer construction of gypsum board provides for a four hour fire rating. Front wall 40 of modular storage unit 30 also has a layer of fiberglass installation (rated R-19) sandwiched between the gypsum board and its outer wall 359.

Referring to FIGS. 1, 2, 13, 17 and 18 by utilizing fiberglass insulation 372 (rated R-19) within the walls 36, 38, 40 and 42 and roof assembly 44, modular storage unit 30 is adapted for use in varying climatic conditions. For example, if it is desired to use modular storage unit 30 in a hot arid climate to distribute hazardous materials, air conditioning could be incorporated in modular storage unit 30 to protect the user of unit 30 from heat exposure since the fiberglass installation 372 will retain cool air within unit 30.

Modular storage unit 30 is adapted to use seismic secondary shelving units (not illustrated) for the storage of hazardous materials. The seismic secondary shelving units used in the interior portion 50 of modular storage unit 30 for storage of hazardous materials is a shelving unit manufactured by Shield Environmental Corporation (SEC) of Irvine, Calif. and described in U.S. Pat. No. 5,356,206 which issued Oct. 18, 1994 to Gary Van Valkenburgh, a co-inventor of the modular storage unit 30 of the present invention. The seismic secondary units are used to relieve spills of hazardous materials on the shelves, are adjustable for various container sizes and allow for movement of containers of hazardous materials stored within the interior portion 50 of modular storage unit 30.

It should also be understood that the present invention contemplates means such as side wall or roof vents (not shown) or an air conditioning and heating system (not shown) to provide the user of modular storage unit 30 with adequate ventilation and/or climate control.

Referring to FIG. 1, 4 and 19, there is shown a second modular storage unit 500 which is aligned in the same horizontal plane with modular storage unit 30 to form a tandem pair of modular storage units 30 and 500. Modular storage unit 500 includes in its left side wall a bellows support frame 506 which is in alignment with the bellows support frame 52 of unit 30 to allow the user of the modular mobile safety structure 499 in FIG. 19 to access either modular storage through a bellows 504.

Bellows 504 includes a pair of rectangular support frames 505 and 507. Rectangular support frame 505 of bellows 504 is coupled to the elongated support members 51 and 53 and the cross channel support member 186 of bellows support frame 52 by means of threaded bolts (not illustrated). In a like manner, rectangular support frame 507 of bellows 504 is coupled to bellows support frame 506 of modular storage unit 500 be means of threaded bolts (not illustrated). This allows for the removal of bellows 504 from support frame 52 of unit 30 and the removal of bellows 504 from support frame 506 of unit 500 whenever it is desired to disassemble the modular storage units of modular mobile safety structure 499.

A first pair of container conlinks 510 are utilized to couple the corner fittings 282 at the top of right side wall 36 of unit 30 to the corner fittings 502 at the top of the left side wall of unit 500. In a like manner, a second pair of container conlinks 510 are utilized to couple the corner fittings 56 at the bottom of right side wall 36 of unit 30 to the corner fittings 503 at the bottom of the left side wall of unit 500. Utilizing the conlinks 510 to couple the modular storage unit 30 and 500 of modular mobile safety structure 499 allows for relatively easy and safe assembling and disassembly the modular storage units comprising modular mobile safety structure 499.

At this time it should be noted that the container conlinks 510 used in the embodiment illustrated in FIG. 19 are Model CTC1012 Container Conlinks commercially available from Peck and Hale of West Sayville, N.Y. It should also be noted that bellows 504 is a custom design bellows commercially available from Gortite of New Berlin Wis.

When the modular storage units 30 and 500 are configured in the manner illustrated in FIG. 19, a rectangular shaped roof section (fabricated in an identical manner to the roof assembly 44 shown in FIG. 17) may be inserted within the support frame 54 to enclose and seal modular mobile safety structure 499 from outside elements such as hazardous gaseous containments in the atmosphere. In addition, sealing modular mobile safety structure in this manner prevents hazardous gaseous containments within structure 499 from escaping into the atmosphere.

If it is desired to add an additional modular storage unit to the modular mobile safety structure illustrated in FIG. 19, the left side wall of unit 500 would require a bellows support frame identical to and aligned with bellows support frame 506. A modular storage unit identical to unit 500 would be positioned adjacent the left side wall of unit 500 and coupled thereto by means of four conlinks and a bellows.

Referring now to FIGS. 1, 19, 20, 21 and 23, FIGS. 20 and 21 illustrate an embodiment of the present invention which includes the modular storage units 30 and 500 of FIG. 19 as well as a second pair of modular storage units 600 and 700 stacked on top of modular storage units 30 and 500.

A first pair of container conlinks 510 (FIG. 21) are utilized to couple the corner fittings 603 at the top of right side wall of unit 600 to the corner fittings 703 at the top of the left side wall of unit 700. In a like manner, a second pair of container conlinks 510 (FIG. 21) are utilized to couple the corner fittings 602 at the bottom of the right side wall of unit 600 to the corner fittings 503 at the bottom of the left side wall of unit 700. Units 600 and 700 of modular mobile safety structure 599 also have aligned bellows support frames 604 and 704 which provide a means for connecting bellows 706 to modular storage units 600 and 700 of modular mobile safety structure 599. Bellows 706 allows the user of modular mobile safety structure 599 to access either of the top pair of modular storage units 600 or 700 of structure 599 from its juxtaposed unit 600 or 700. In a like manner, bellows 504 allows the user of modular mobile safety structure 599 to access either of the bottom pair of modular storage units 30 or 500 of structure 599 from its juxtaposed unit 30 or 500.

A first set of four twistlock stackers 710 are utilized to couple modular storage unit 600 to modular storage unit 30 when these units are stacked in the configuration of modular mobile safety structure 599 illustrated in FIGS. 20 and 21. In a like manner, a second set of four twistlock stackers 710 are utilized to couple modular storage unit 700 to modular storage unit 500 when these units are stacked in the configuration of modular mobile safety structure 599 also illustrated in FIGS. 20 and 21.

At this time, it should be noted that the twistlock stackers 710 used in the modular mobile safety structure 599 of FIGS. 21 and 22 are Model F633 Twistlock Stackers commercially available from Peck and Hale of West Sayville, N.Y.

Referring now to 2FIGS. 21 and 22, modular storage unit 30 includes rectangular shaped ladder support frame 54, which provides a support structure for pull down safety ladder 55. Pull down safety ladder 55 has attached thereto a pull down cord 53 which allows the user of unit 30 to pull safety ladder from the ceiling of unit 30 (illustrated in phantom) to the floor 68 (FIG. 1) of unit 30 in the manner indicated by arrow 609. When it is desired to disassemble modular mobile safety structure 599 to relocate structure 599 pull down safety ladder 55 may be repositioned to rest against the ceiling of unit 30 as shown in phantom in FIG. 22.

Modular storage unit 600 has in its base assembly and base plate 615 a rectangular shaped secondary containment wall 611 which is in alignment with the rectangular shaped ladder support frame 54. Secondary containment wall 611 prevent hazardous materials in the containment pan of unit 600 from leaking through the opening or passageway 606 formed by support frame 54 and containment wall 611 into unit 30. Passageway 606 and ladder 55, in turn, allows the user of modular mobile safety structure 599 to access either modular storage unit 600 and 700 from unit 30.

It should be noted that several commercially available pull down safety ladders are well suited for use in modular mobile safety structure 599 such as the Cotterman Series 2500 Heavy Duty Knock Down Safety Ladders. In the alternative safety ladder 54 may be a hydraulically activated safety ladder which includes hand rails.

Referring to FIG. 22 there is attached to secondary containment wall 611 a plurality of hand rail support members 605 which are adapted to receive and secure a hand rail 608 to the floor of modular storage unit 600. The hand rail support m embers 605 also allow for the removal of hand rail 608 in manner indicated by arrow 607 when it is desired to disassemble modular mobile safety structure 599.

Figure 25:
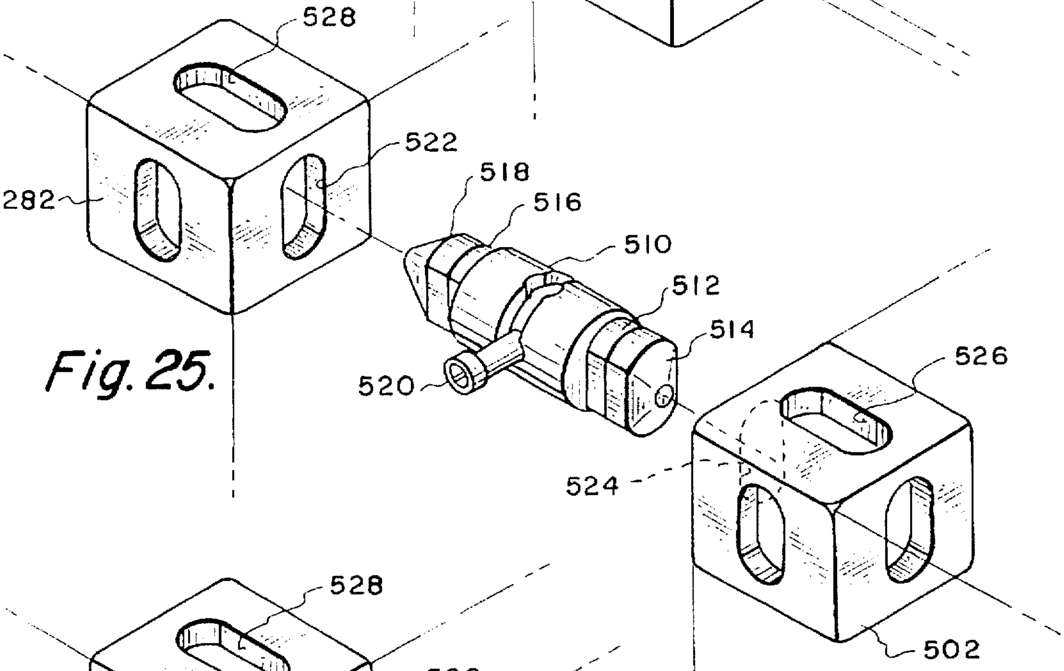
FIG. 25 is an exploded isometric view of the bottom pair of the four corner fittings of the coupling assembly of FIG. 24 and their associated container conlink.
Figure 26:
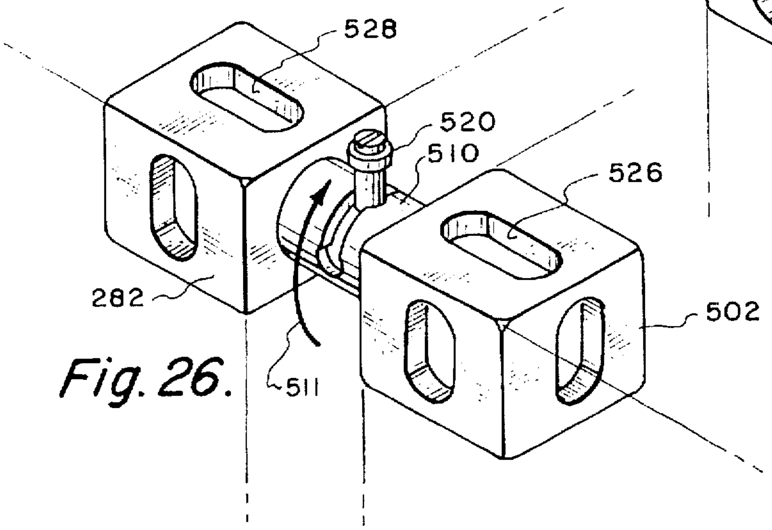
FIG. 26 is an isometric view illustrating the container conlink securing the corner fittings of FIG. 24.

Referring to FIGS. 21, 24, 25 and 26, container conlink 510 couples the corner fitting 282 at the top and front of right side wall 36 of unit 30 to the corner fitting 502 at the top and front of the left side wall of unit 500. Container conlink 510 includes a locking arm 520 which is used to lock container conlink 510 to corner fittings 282 and 502 as shown in FIG. 26 or unlock container conlink 510 from corner fittings 282 and 502 as shown in FIG. 25. When the locking arm 520 is rotated in the clockwise direction (indicated by arrow 511) to a locked position one of the locking members 518 of container conlink 510 rotates to engage the inner surface of corner fitting 282, while the other locking member 514 rotates to engage the inner surface of corner fitting 502 securing corner fittings 282 and 502 to container conlink 510.

It should be noted that each opening 522 or 524 within corner fittings 282, 502, 602 and 702 is elongated with semicircular ends to allow locking members 514 and 518 of conlink 510 to pass through their associated opening 522 or 524 and provide a secure fit for support member 512 or 516 when container conlink 510 is in the lock position illustrated in FIG. 26.

Figure 27:
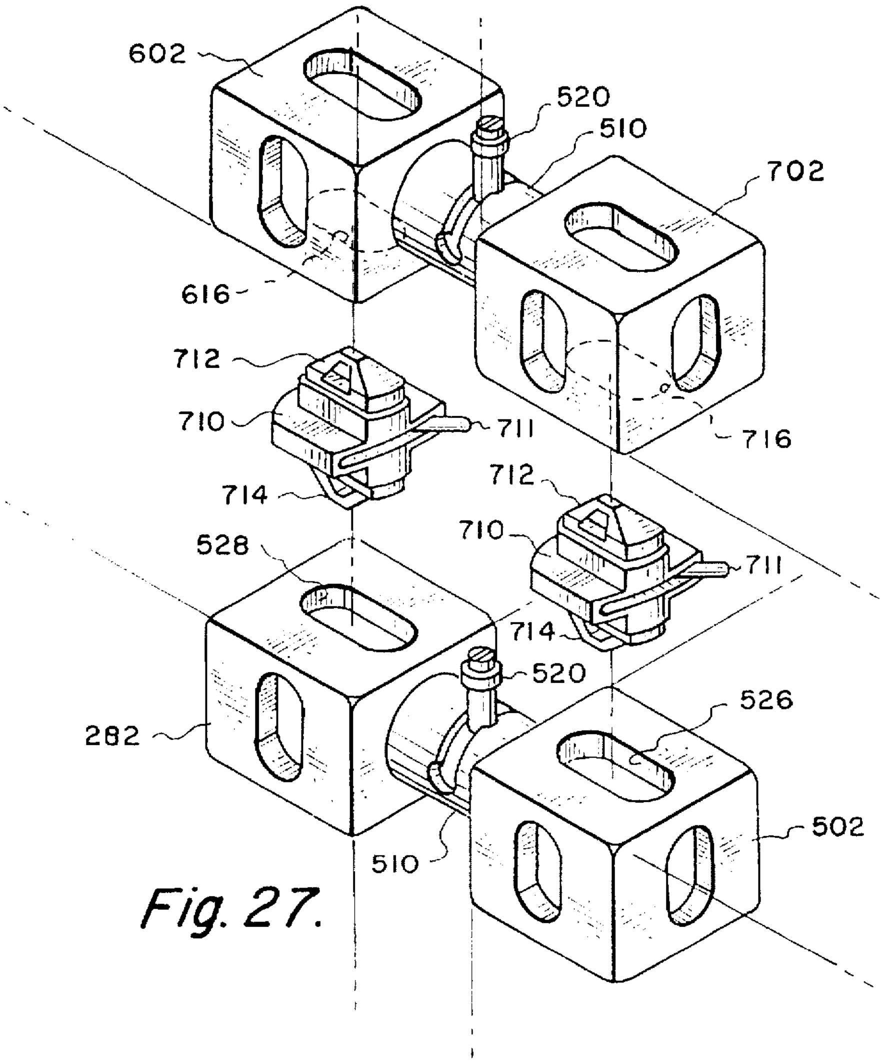
FIG. 27 is an exploded isometric view illustrating a pair of twistlock stackers which secure the corner fittings of the bottom pair of the four corner fittings of FIG. 24 to the top pair of the four corner fittings of FIG. 24.
Figure 28:
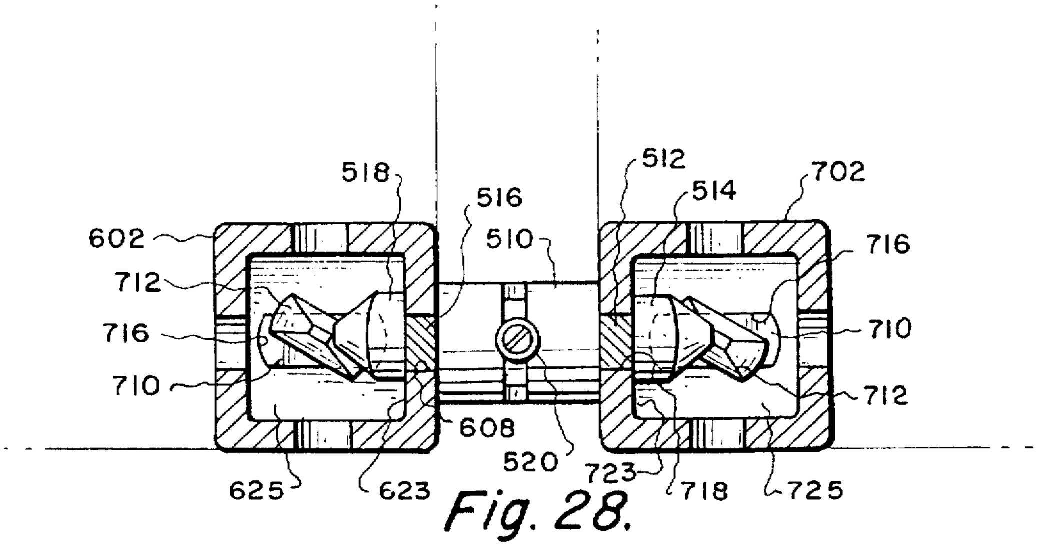
FIG. 28 is a sectional view illustrating the container conlink securing the corner fittings of FIG. 24.

Referring to FIGS. 21, 27 and 28 the twistlock stackers 710 illustrated in FIG. 27 operate in exactly the same manner as container conlinks 510 to secure corner fittings 282 and 502 respectively to corner fittings 602 and 702. When the locking arm 711 of left twisted stacker 710 is rotated in the clockwise direction to a locked position one of its locking members 712 rotates to engage the inner surface 625 of corner fitting 602, while the other locking member 714 rotates to engage the inner surface of corner fitting 282 securing corner fittings 282 and 602 to left twisted stacker 710. Similarly, when the locking arm 711 of right twisted stacker 710 is rotated in the clockwise direction to a locked position one of its locking members 712 rotates to engage the inner surface 725 of corner fitting 702, while the other locking member 714 rotates to engage the inner surface of corner fitting 502 securing corner fittings 702 and 502 to right twisted stacker 710. It should be noted that openings 526, 528, 616 and 716 are elongated with semicircular ends to allow locking members 712 and 714 of left and right twisted stackers 710 to pass through their associated openings 526, 528, 616 or 716 to secure the corner fitting 282 to 602 and the corner fitting 502 to 702.

Referring to FIG. 28 the container conlink 510 utilized to secure corner fitting 602 to corner fitting 702 has its locking member 518 engage the inner surface 623 of corner fitting 602 and its locking member 514 engage the inner surface 723 of corner fitting 702 when container conlink 510 is in the locked positioned.

From the foregoing, it may readily be seen that the present invention comprises a new, unique and exceedingly useful mobile safety structure for the containment and handling of hazardous materials which constitutes a considerable improvement over the known prior art. Obviously, many modifications and variations of the present invention are possible in light of the above teachings. It is therefore to be understood that within the scope of the appended claims the invention may be practiced otherwise than as specifically described.

What is claimed is:

1. A modular mobile safety structure for housing containers of hazardous materials and providing sump-type secondary containment for receiving spillage and leakage of said hazardous materials from said containers that are housed within said modular mobile safety structure, said modular mobile safety structure comprising:

(a) first and second modular storage units, said first modular storage unit being positioned adjacent said second modular storage unit and secured thereto to form a tandem arrangement of modular storage units for treatment and handling of said hazardous materials, said first and said second modular storage units each comprising:

(i) a rectangular shaped base assembly including a framework of a welded assembly of steel components, said framework of said base assembly comprising:

(A) a pair of front and rear support members and a pair of side support members that are arranged end to end to define a rectangular shaped structure, a first group of four corner fittings having first and second orthogonally disposed sides, a top portion and a bottom portion, each end of each of said side support members being attached to the first side of a separate one of said first group of four corner fittings and each end of each of said front and rear support members being attached to the second side of a separate one of said first group of four corner fittings;

(B) a pair of inverted T channel support members disposed substantially parallel to said front and rear support members, one end of each of said inverted T channel support members being attached to one of said side support members and an opposite end of each of said inverted T channel support members being attached the other of said side support members, each of said inverted T channel support members having a base channel member and a floor support channel member mounted on a top portion of said base channel member;

(C) first and second floor support members respectively attached to an inner side of said front support member and an inner side of said rear support member;

(D) a first generally rectangular shaped steel plate mounted on a bottom portion of said front, rear and side support members and a bottom portion of the base channel support member of said pair inverted T channel support members wherein said first generally rectangular shaped steel plate mates with said front, rear and side support members forming a substantially rectangular open secondary container that is leakproof, said open secondary container receiving spillage and leakage of said hazardous materials from said containers that are housed within each of said first and said second modular storage units;

(E) a removable grating type floor supported by said base assembly and resting upon said first and said second floor support members and the floor support channel members of said pair of inverted T channel support members, said removable grating type floor extending substantially horizontally atop said open secondary container;

(ii) inner and outer side walls extending perpendicularly upward from said base assembly, a rear wall extending perpendicularly upward from said base assembly and a front wall extending perpendicularly upward from said base assembly, one end of each of said inner and said outer side walls being secured to a separate one of the opposed ends of said front wall and the other end of each of said inner and said outer side walls being secured to a separate one of the opposed ends of said rear wall to form a rectangular shaped assembly of upstanding walls;

(iii) a rectangular shaped roof mounted atop said rectangular shaped assembly of upstanding walls and extending horizontally over an interior space that is defined between said front and rear walls and between said inner and said outer side walls;

(iv) each of said front, said rear and said inner and said outer side walls and said roof comprising:

(A) a rectangular shaped framework of structural steel support members, at least one outer wall panel mounted to an outer surface of said rectangular shaped framework, an inner wall panel mounted to an inner surface of said rectangular shaped framework, a pair of stack sheets of gypsum type board sandwiched between said at least one outer wall panel and said inner wall panel, said pair of stack sheets of gypsum board being secured to said inner wall panel, and a fiberglass insulation material interposed between said pair of stack sheets of gypsum type board and said at least one outer wall panel;

(B) said pair of stack sheets of gypsum type board within each of said front, rear and side walls and said roof providing for a fire rating of at least four hours for said modular mobile safety structure and said fiberglass insulation material allowing said modular mobile safety structure to be adapted for use under varying climatic conditions;

(C) the rectangular shaped framework of said roof having a second group of four corner fittings wherein a first and a second of said second group of four corner fittings are positioned at a top edge region of the inner side wall of said first and said second modular storage units (D) a first and a second of said first group of four corner fittings being positioned in proximity with a bottom end region of the inner side wall of said first and said second modular storage units;

(b) a first pair of container conlinks for coupling the first and the second of said second group of four corner fittings of said first modular storage unit to the first and the second of said second group of four corner fittings of said second modular storage unit;

(c) a second pair of container conlinks for coupling the first and the second of said first group of four corner fittings of said first modular storage unit to the first and the second of said first group of four corner fittings of said second modular storage unit;

(d) said inner side wall of said first and said second modular storage units having a bellows support frame, the bellows support frame of the inner side wall of said first modular storage unit being aligned with the bellows support frame of the inner side wall of said second modular storage unit when said first modular storage unit is positioned adjacent said second modular storage unit to form said tandem arrangement of modular storage units; and (e) a bellows having one end thereof connected to the bellows support frame of the inner side wall of said first modular storage unit and an opposite end thereof connected to the bellows support frame of the inner side wall of said second modular storage unit, said bellows allowing access between said first modular storage unit and said second modular storage, said bellows being removable from the bellows support frame of the inner side wall of said first and said second modular storage units.

2. The modular mobile safety structure of claim 1 further comprising a rectangular shaped door frame mounted within said front wall of each of said first and said second modular storage units, a door connected to said rectangular shaped door frame of each of said first and said second modular storage units and being movable relatively thereto for controlling access to an interior space within said first and said second modular storage units of said modular mobile safety structure.

3. The mobile safety structure of claim 1 further comprising four dual wheel casters, each of said four dual wheel casters being coupled to a separate one of said first group of four corner fittings of said base assembly of said first and said second modular storage units, said four dual wheel corner casters allowing a movement of said first and said second modular storage units of said modular mobile safety structure from a first location to a second location.

4. The mobile safety structure of claim 1 further comprising a tow bar coupled to two of said first group of four corner fittings for each of said first and said second modular storage units.

5. The mobile safety structure of claim 1 wherein said fiberglass insulation material comprises R-19 rated fiberglass insulation.

6. The mobile safety structure of claim 1 wherein said at least one panel of each of said front, rear and side walls and said roof is fabricated from 10 gauge steel plate.

7. The mobile safety structure of claim 1 wherein said inner wall panel of each of said front, rear and side walls and said roof is fabricated from 18 gauge steel plate.

8. The mobile safety structure of claim 1 further comprising means for securing said pair of stack sheets of gypsum type board and said inner wall panel to the rectangular shaped framework of structural steel support members for each of said front, rear and side walls and said roof.

9. The mobile safety structure of claim 8 wherein said means for securing said gypsum type board and said inner wall panel comprises stainless steel self-tapping screws.

10. The mobile safety structure of claim 1 wherein each of said pair of stack sheets of gypsum board comprises a ¾ inch of gypsum board.

11. A modular mobile safety structure for housing containers of hazardous materials and providing sump-type secondary containment for receiving spillage and leakage of said hazardous materials from said containers that are housed within said modular mobile safety structure, said modular mobile safety structure comprising:

(a) first and second modular storage units, said second modular storage unit being positioned on top of said first modular storage unit and secured thereto to form a stacked arrangement of modular storage units for treatment and handling of said hazardous materials, said first and said second modular storage units each comprising:

(i) a rectangular shaped base assembly including a framework of a welded assembly of steel components, said framework of said base assembly comprising:

(A) a pair of front and rear support members and a pair of side support members that are arranged end to end to define a rectangular shaped structure, a first group of four corner fittings having first and second orthogonally disposed sides, a top portion and a bottom portion, each end of each of said side support members being attached to the first side of a separate one of said first group of four corner fittings and each end of each of said front and rear support members being attached to the second side of a separate one of said first group of four corner fittings;

(B) a pair of inverted T channel support members disposed substantially parallel to said front and rear support members, one end of each of said inverted T channel support members being attached to one of said side support members and an opposite end of each of said inverted T channel support members being attached the other of said side support members, each of said inverted T channel support members having a base channel member and a floor support channel member mounted on a top portion of said base channel member;

(C) first and second floor support members respectively attached to an inner side of said front support member and an inner side of said rear support member;

(D) a first generally rectangular shaped steel plate mounted on a bottom portion of said front, rear and side support members and a bottom portion of the base channel support member of said pair inverted T channel support members wherein said first generally rectangular shaped steel plate mates with said front, rear and side support members forming a substantially rectangular open secondary container that is leakproof, said open secondary container receiving spillage and leakage of said hazardous materials from said containers that are housed within each of said first and said second modular storage units;

(E) a removable grating type floor supported by said base assembly and resting upon said first and said second floor support members and the floor support channel members of said pair of inverted T channel support members, said removable grating type floor extending substantially horizontally atop said open secondary container;

(ii) first and second side walls extending perpendicularly upward from said base assembly, a rear wall extending perpendicularly upward from said base assembly and a front wall extending perpendicularly upward from said base assembly, one end of each of said side walls being secured to a separate one of the opposed ends of said front wall and the other end of each of said side walls being secured to a separate one of the opposed ends of said rear wall to form a rectangular shaped assembly of upstanding walls;

(iii) a rectangular shaped roof mounted atop said rectangular shaped assembly of upstanding walls and extending horizontally over an interior space that is defined between said front and rear walls and between said first and said second side walls;

(iv) each of said front, said rear and said first and said second side walls and said roof comprising:

(A) a rectangular shaped framework of structural steel support members, at least one outer wall panel mounted to an outer surface of said rectangular shaped framework, an inner wall panel mounted to an inner surface of said rectangular shaped framework, a pair of stack sheets of gypsum type board sandwiched between said at least one outer wall panel and said inner wall panel, said pair of stack sheets of gypsum board being secured to said inner wall panel, and a fiberglass insulation material interposed between said pair of stack sheets of gypsum type board and said at least one outer wall panel;

(B) said pair of stack sheets of gypsum type board within each of said front, rear and side walls and said roof providing for a fire rating of at least four hours for said modular mobile safety structure and said fiberglass insulation material allowing said modular mobile safety structure to be adapted for use under varying climatic conditions;

(C) the rectangular shaped framework of said roof having a second group of four corner fittings, each of said second group of four corner fittings of said first modular storage unit being aligned with one of said first group of four corner fittings of said second modular storage unit;

(b) four twistlock stackers, each of said four twistlock stackers coupling one of said second group of four corner fittings of said first modular storage unit to an aligned one of said first group of four corner fittings of said second modular storage unit to secure said second modular storage unit to said first modular storage unit;

(c) a rectangular shaped ladder support frame located in the roof of said first modular storage unit and a pull down safety ladder affixed to said rectangular shaped ladder support frame; and (d) a rectangular shaped secondary containment wall located in the rectangular shaped base assembly of said second modular storage unit, said rectangular shaped secondary containment wall being aligned with said rectangular shaped ladder support frame to form a passageway between said first modular storage unit and said second modular storage unit, said rectangular shaped secondary containment wall being an integral component of the open secondary container of said second modular storage unit to prevent said hazardous materials received by said open secondary container of said second modular storage unit from spilling into said passageway.

12. The modular mobile safety structure of claim 11 further comprising a rectangular shaped door frame mounted within said front wall of each of said first and said second modular storage units, a door connected to said rectangular shaped door frame of each of said first and said second modular storage units and being movable relatively thereto for controlling access to an interior space within said first and said second modular storage units of said modular mobile safety structure.

13. The mobile safety structure of claim 11 further comprising four dual wheel casters, each of said four dual wheel casters being coupled to a separate one of said first group of four corner fittings of said base assembly of said first and said second modular storage units, said four dual wheel corner casters allowing a movement of said first and said second modular storage units of said modular mobile safety structure from a first location to a second location.

14. The mobile safety structure of claim 11 further comprising a tow bar coupled to two of said first group of four corner fittings for each of said first and said second modular storage units.

15. The mobile safety structure of claim 11 wherein said fiberglass insulation material comprises R-19 rated fiberglass insulation.

16. The mobile safety structure of claim 11 wherein said at least one panel of each of said front, rear and side walls and said roof is fabricated from 10 gauge steel plate.

17. The mobile safety structure of claim 11 wherein said inner wall panel of each of said front, rear and side walls and said roof is fabricated from 18 gauge steel plate.

18. The mobile safety structure of claim 11 further comprising means for securing said pair of stack sheets of gypsum type board and said inner wall panel to the rectangular shaped framework of structural steel support members for each of said front, rear and side walls and said roof.

19. The mobile safety structure of claim 18 wherein said means for securing said gypsum type board and said inner wall panel comprises stainless steel self-tapping screws.

20. The mobile safety structure of claim 11 wherein each of said pair of stack sheets of gypsum board comprises a ¾ inch of gypsum board.

* * * * *